United States Patent

Chen et al.

Patent Number: 5,652,687
Date of Patent: Jul. 29, 1997

[54] PLANARIZED THIN FILM MAGNETIC WRITE HEAD WITH SUBMICRON TRACKWIDTH

[75] Inventors: Mao-Min Chen; Kochan Ju, both of San Jose; Neil Leslie Robertson, Campbell; Hugo Alberto Emilio Santini, San Jose, all of Calif.

[73] Assignee: International Business Machines Corporation, Armonk, N.Y.

[21] Appl. No.: 531,530

[22] Filed: Sep. 21, 1995

Related U.S. Application Data

[63] Continuation of Ser. No. 229,484, Apr. 19, 1994, abandoned

[51] Int. Cl.$^6$ .............. G11B 5/147; G11B 5/23; G11B 5/187
[52] U.S. Cl. .............. 360/126; 360/119; 360/122
[58] Field of Search .............. 360/126, 119, 360/122

[56] References Cited

U.S. PATENT DOCUMENTS

| | | | |
|---|---|---|---|
| 3,614,339 | 10/1971 | Schneider | 179/100.2 |
| 4,550,353 | 10/1985 | Hirai et al. | 360/125 |
| 4,551,911 | 11/1985 | Sasaki et al. | 29/576 |
| 4,675,986 | 6/1987 | Yen | 29/603 |
| 4,689,877 | 9/1987 | Church | 29/603 |
| 4,839,197 | 6/1989 | Henderson | 427/116 |
| 4,843,507 | 6/1989 | Schewe et al. | 360/125 |
| 4,878,290 | 11/1989 | Masud et al. | 29/603 |
| 5,111,352 | 5/1992 | Das et al. | 360/113 |
| 5,282,308 | 2/1994 | Chen et al. | 29/603 |
| 5,283,942 | 2/1994 | Chen et al. | 29/603 |
| 5,285,340 | 2/1994 | Ju et al. | 360/126 |
| 5,289,325 | 2/1994 | Morehouse et al. | 360/105 |
| 5,452,164 | 9/1995 | Cole et al. | 360/126 |

FOREIGN PATENT DOCUMENTS

| | | |
|---|---|---|
| 60-10409 | 1/1985 | Japan. |
| 62-119716 | 6/1987 | Japan. |
| 3-162706 | 7/1991 | Japan. |

*Primary Examiner*—John H. Wolff
*Assistant Examiner*—Adriana Giordana
*Attorney, Agent, or Firm*—Baker, Maxham, Jester & Meador

[57] ABSTRACT

A thin film magnetic write head is provided with a notch structure located on top of one of two pole layers. The notch structure is a generally U-shaped thin film layer which forms a trench inside the U for the containment of one or more pole tip layers in the pole tip region of the head. The notch structure has front surfaces at the tips of the legs of the U which lie in a plane that forms a part of the air bearing surface. The thickness of the notch layer is substantially equal to the thickness or thicknesses of the one or more pole tip layers located in the trench. A method of manufacturing the write head includes forming a very thin photoresist layer for defining the notch structure. The notch structure is well-defined which in turn allows the one or more pole tip layers to be well-defined with a very narrow trackwidth in the trench.

41 Claims, 17 Drawing Sheets

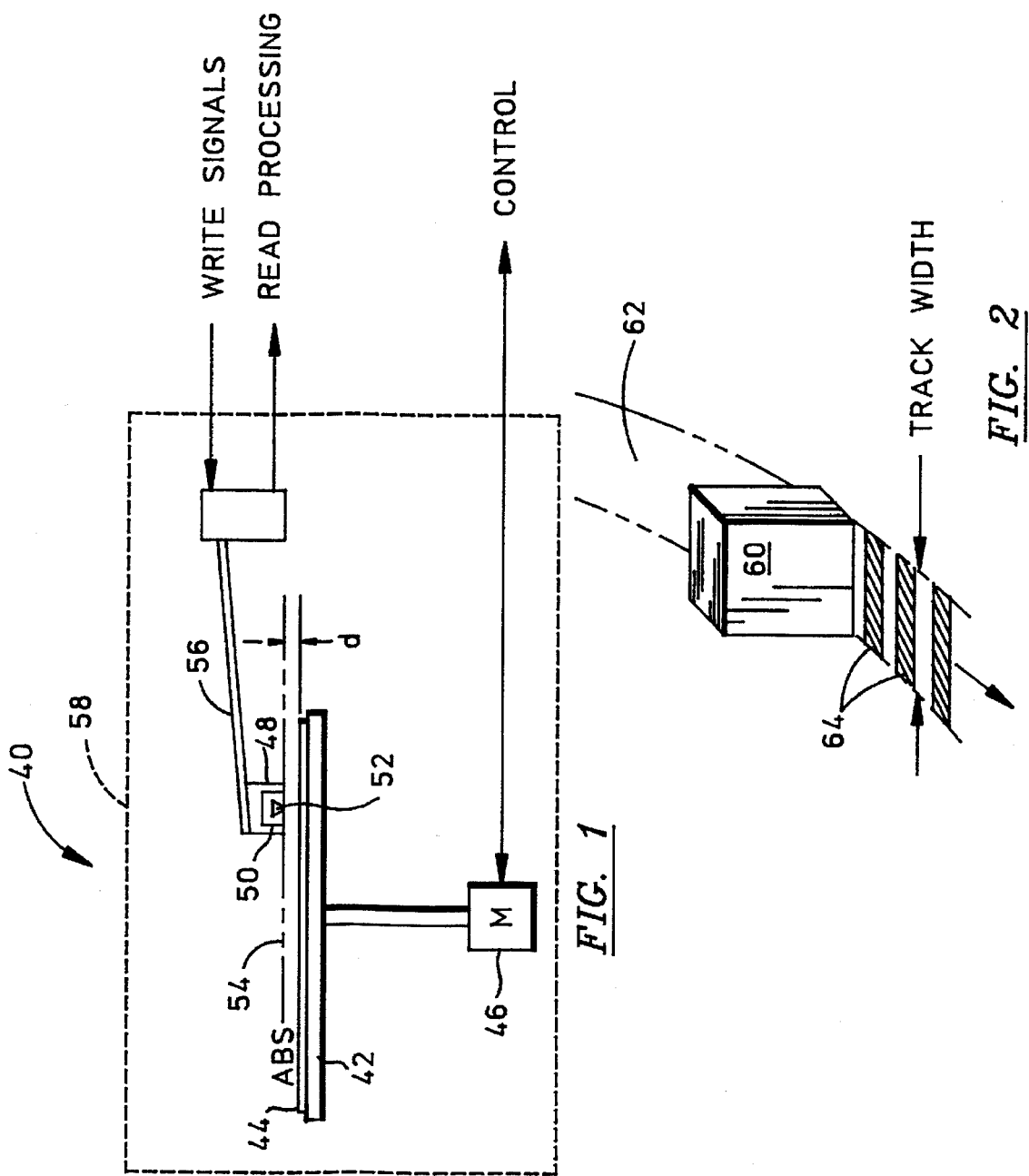

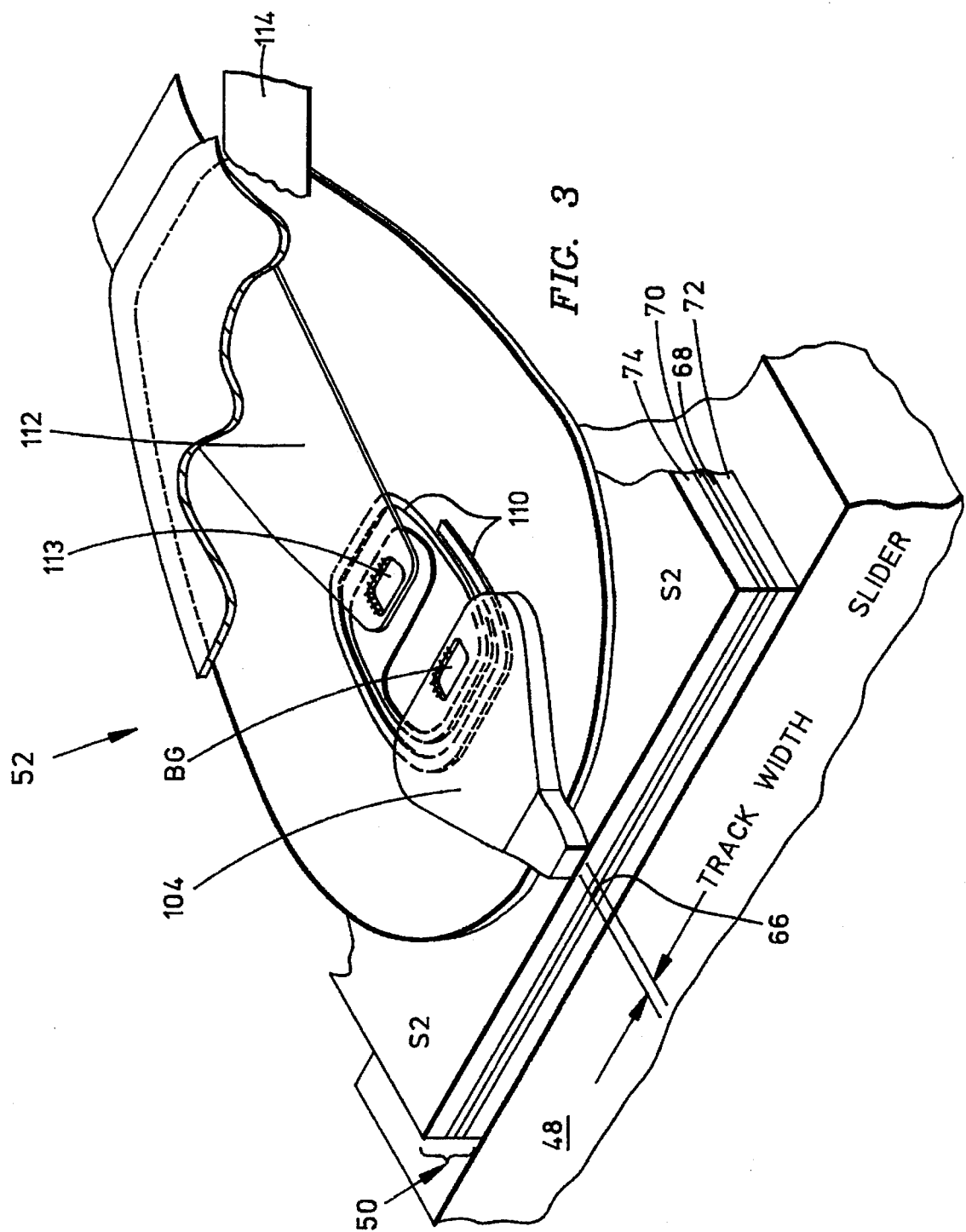

PLANARIZED THIN FILM MAGNETIC WRITE HEAD WITH SUBMICRON TRACKWIDTH

This application is a continuation of application Ser. No. 08/229,484, filed Apr. 19, 1994 now abandoned.

BACKGROUND OF THE INVENTION

1. Field of the Invention

The present invention relates to a thin film magnetic write head and more particularly to a thin film magnetic write head which has a submicron trackwidth.

2. Description of the Related Art

In a magnetic disk drive, data is written and read by magnetic transducers called "heads" which are positioned over a disk while it is rotated at a high speed. Magnetic heads are mounted on sliders that are supported over a surface of the disk by a thin cushion of air (an "air bearing") produced by the disk's high rotational speed. In order to increase the amount of data stored per unit of disk surface area ("areal density"), more data must be written in narrower tracks on the disk surface.

One principal means of improving areal density of magnetic recording is to improve the number of data tracks which a write head can record on a disk; the related parametric expression is "tracks per inch" or "TPI". The TPI capability of a write head is increased by decreasing the head dimension which determines the width of a data track; typically this dimension is called the head "trackwidth".

In electromagnetic recording, thin film read and write heads are desirable because they provide narrow trackwidths and support high areal density. They are also easy to manufacture. With various thin film manufacturing techniques, such heads can be fabricated in batches on a substrate and then individuated.

A thin film write head includes pole pieces that are formed from thin films ("layers") of magnetic material. These layers are called "pole layers". In the pole tip region, the pole layers have a height dimension commonly called "throat height". In a finished write head, throat height is measured between an air bearing surface ("ABS") formed by polishing the tips of the pole layers ("pole tips") and a zero throat height level ("zero throat level") where a bottom pole layer (P1) and a top pole layer (P2) converge at the magnetic recording gap.

A thin film magnetic write head includes the pole tip region, which is located between the air bearing surface and the zero throat level, and a back region which extends back from the zero throat level to and including a back gap. The write head also has a yoke which includes the top and bottom pole layers, each pole layer having a pole tip in the pole tip region and a back portion in the back region. The pole layers are connected together at the back gap. An important manufacturing objective is to precisely define the pole tips of the write head thereby to maximize areal density. As is known, areal density is determined, in part, by the number of flux reversals per millimeter of track length, which in turn depends upon the length of the gap between the pole tips ("gap length"). By decreasing the gap length, the bit density within a track is increased. The shortness of the gap length is limited by the decreasing flux intensity between the pole tips. Therefore, efforts have been directed toward reducing the trackwidth of the write head, which is determined by the width of the pole layers in the pole tip region at the ABS.

The procedure for manufacturing a thin film magnetic write head in the prior art typically comprises forming a top pole layer after one or more insulation layers are formed on top of a coil layer. The insulation layers typically comprise resist material which is hardened in place by baking. During baking, resist layers flow forward and shrink backwards with respect to the pole tip region. The final configuration of the top insulation layer has a topography which slopes down toward the pole tip region. After depositing a seedlayer a thick resist layer is deposited. This layer is typically 10 microns or more thick. The resist layer follows the topography of the top insulation layer and builds structure in the pole tip region to a substantial thickness. The resist layer is then patterned by photolithography for the configuration of the top pole layer. During the photolithography step light penetrates the resist layer for patterning purposes. The thicker the resist layer the more this light scatters in a lateral direction, causing the edges of the photoresist pattern to be poorly defined. Because of this poor definition the narrowest pattern obtainable for the portion of the P2 pole layer which defines the second pole piece in the pole tip region is about 2 microns for a 4 micron thick plated pole tip. The next step is to plate the P2 pole layer and remove the photoresist. The result is a P2 pole tip with a width of about 2 microns which defines the trackwidth of the write head. It would be desirable if the trackwidth could be further still decreased so as to increase track density (TPI).

The challenge in building a head with a thin gap layer and narrow trackwidth is to minimize flux leakage, which increases as the gap length is reduced, and to avoid saturation, which occurs at lower flux levels with narrower pole tips. The first problem is alleviated by reducing the length of the pole tip region between ABS and zero throat level. The invention provides a solution to the second problem by avoiding saturation while providing a narrow trackwidth.

SUMMARY OF THE INVENTION

The present invention provides a thin film magnetic write head with a narrow trackwidth, which avoids saturation. With the invention, submicron trackwidths are obtainable.

The invention employs a notch structure which is left in place in the pole tip region during fabrication of the write head. The notch structure is preferably U-shaped. The U-shape provides the notch structure with a base and a pair of legs. Front surfaces of the legs lie in a common plane which forms a part of the air bearing surface. A front surface of the base and inside side surfaces of the legs form a trench inside the U-shape of the notch structure, the trench being located in the pole tip region. A narrow pole tip layer forming a pole tip portion of at least one pole layer, such as P2, is located in the notch. Each pole layer has a front surface which lies in a common plane that forms a part of the air bearing surface. In one embodiment of the invention, only a pole tip layer for pole layer P2 is located in the notch. In another embodiment, pole tip layers for both pole layers and the gap layer are located in the trench. From the plane of the ABS back through the zero throat level, the pole layers are wider than, and parallel to, the pole tip layer(s), providing a parallel path for conducting flux to and from the pole tip regions and increasing its capacity to conduct flux. This structure avoids saturation and provides high flux density for stored data.

A key in providing the aforementioned novel magnetic head is a novel process for fabricating the notch structure. This process includes first forming an anisotropically etchable layer, such as silicon dioxide, on top of a bottom pole layer of the head. Next a very thin resist layer, such as 0.7 to 0.8 microns thick, is deposited on top of the silicon dioxide layer. The thin resist layer is patterned with a photo mask. Because of the thinness of the resist layer there is virtually no lateral scattering of the light. The result is a photoresist pattern with well-defined edges. The photoresist mask leaves a portion of the top surface of the silicon dioxide layer exposed, the exposed portion being a U-shape about the pole tip region. A metal layer is formed on top of the photoresist layer and on top of the exposed top U-shaped surface portion of the silicon dioxide layer. The photoresist layer along with the metal layer on top of the photoresist layer is removed, leaving a U-shaped metal layer on top of the silicon dioxide layer at the location where the notch is desired. Reactive ion etching (RIE) is then employed to remove the silicon dioxide layer except where it is covered with the U-shaped metal layer, thereby leaving a U-shaped silicon dioxide notch structure, capped with the metal layer, about the pole tip region. This notch structure is left in place during subsequent process steps and becomes a part of the write head. The material of the notch structure has no effect on the operation of the write head. In fact, it aids in planarizing the materials of the subsequent process steps and distances the P2 pole layer from the zero throat level to prevent undesirable flux leakage between the pole layers and the back of the pole tip region.

An object of the present invention is to provide a thin film magnetic write head having a submicron trackwidth and a zero throat level which lies in a plane that is parallel to the plane of the air bearing surface.

Yet another object is to provide a trench in the pole tip region of the thin film magnetic write head, the trench containing one or more pole tip layers as required.

Still another object is to accomplish the foregoing objects and in addition to provide a material for a notch structure which forms the trench which is compatible with the operation of the thin film magnetic write head.

Still a further object is to provide a method of making the thin film magnetic write head set forth in any one or any combination of the objectives hereinabove.

Still another object is to provide a method of making the thin film magnetic write head wherein a notch defining a structure for the pole tip region can be configured by a submicron photoresist layer which is narrowly patterned to provide a submicron trackwidth and an accurately placed zero throat level lying in a plane that is parallel to the plane of the air bearing surface.

Other objects will become apparent when considered in light of the following description of the invention.

BRIEF DESCRIPTION OF THE DRAWINGS

FIG. 1 is a schematic illustration of a magnetic disk drive, not to scale, which employs the thin film magnetic write head of the present invention.

FIG. 2 is a schematic illustration of a magnetic head positioned above a track of a magnetic disk.

FIG. 3 is an isometric illustration of a thin film merged head with portions broken away to illustrate various details thereof.

DETAILED DESCRIPTION OF THE PREFERRED EMBODIMENTS

Figure 4:
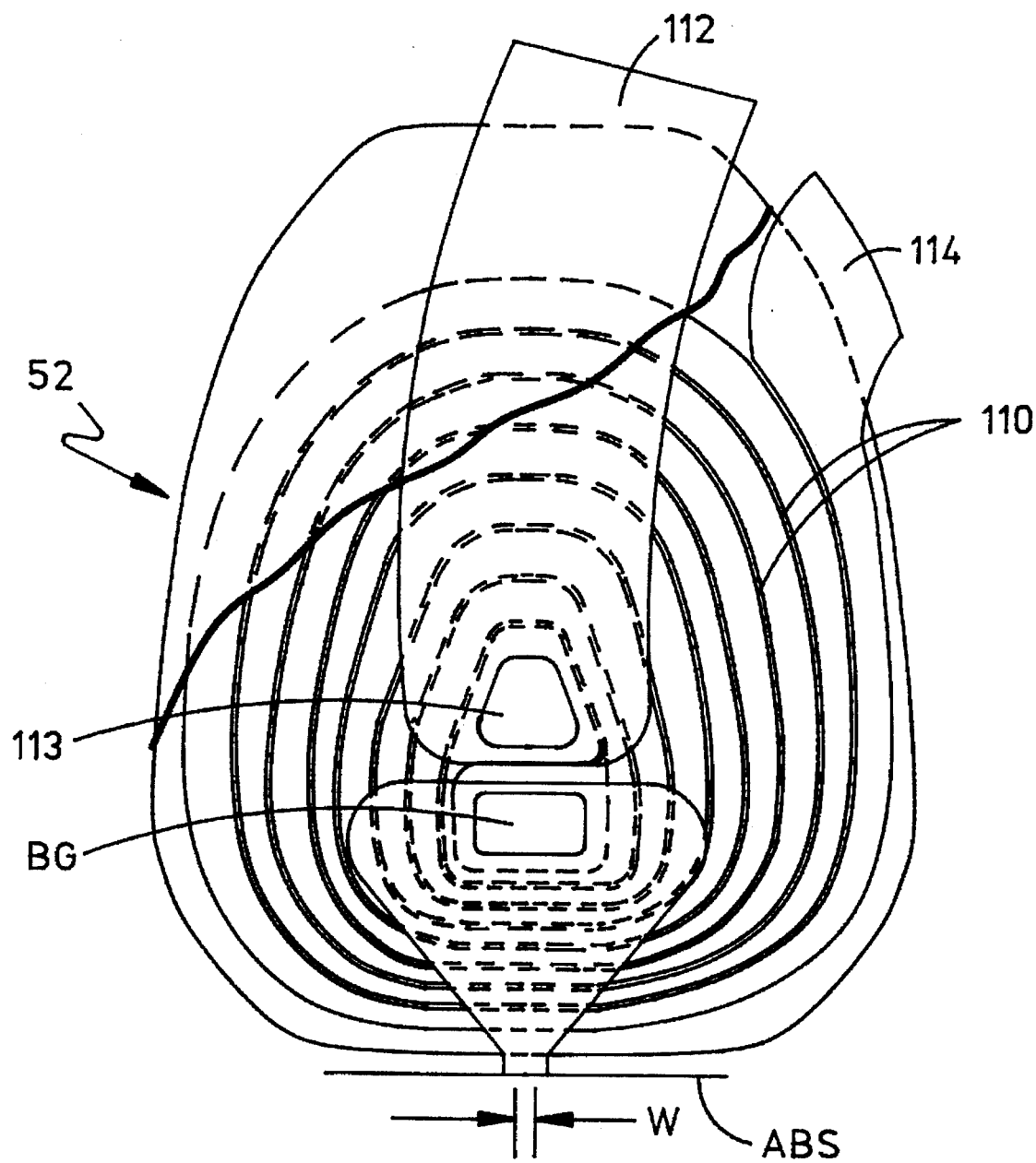
FIG. 4 is a schematic planar illustration of a thin film magnetic write head with various portions broken away to illustrate various details thereof.

Referring now to the drawings, which are not to scale and which may exaggerate dimensions in order to better illustrate certain features, like reference numerals designate like or similar parts throughout the similar views. There is illustrated in FIG. 1 a disk drive 40 which includes a rotatable magnetic disk 44. The disk 44 is rotated by a motor 46 which is responsive to control signals from a drive control source (not shown). When the magnetic disk 44 is rotated by the motor 46, a merged head, which is mounted on a slider 48, is supported against the surface 49 of the magnetic disk 44 by an air bearing. The merged head may include a read head 50 and a write head 52. The bottom surfaces of the slider 48 and the merged head (50 and 52) are polished during construction to form a common planar surface which is called the air bearing surface (ABS) 54. The ABS 54 is spaced above the top plane of the magnetic disk 44 by a distance d when the magnetic disk is rotating. The slider 48 is connected to a head suspension assembly (HSA) 56 which includes means (not shown) for conducting read/write signals between the merged head and drive electronics 59. The above components of the drive are mounted within a drive housing 58.

A write head is represented schematically at 60 in FIG. 2 in relationship to a track 62 of a rotating magnetic disk. Digital information in the form of flux reversals induced on the track of the magnetic disk is schematically illustrated at 64. The number of these flux reversals per millimeter length of the track is a measure of the linear or bit density of the write head. When the length of the write head gap (not shown) is reduced, the bit density is increased. Heretofore, the optimum bit density obtainable has been with a gap length of approximately 0.3 microns. When the gap length is reduced much less than this amount, the flux density between the pole tips is insufficient for adequate writing. Another important measure, however, is the TPI of the write head 60. The narrower the width of the write head's pole tip elements, the greater the TPI. Accordingly, one of the prime objectives of the present invention is to provide pole tip elements for a write head which have a width less than 1 micron, but which retain the optimum gap length of approximately 0.3 microns.

FIGS. 3 and 4 are schematic illustrations of a portion of a merged head that includes a thin film magnetoresistive read head and a thin film magnetic write head. The read head is indicated generally by 50, and the write head is indicated generally by 52. The merged head is mounted on the slider 48. As shown in FIG. 3, the read head 50 includes a magnetoresistive element 66 which is sandwiched between first and second gap layers 68 and 70, the gap layers in turn being sandwiched between first and second shield layers 72 and 74. In a merged head configuration it may be desirable that the second shield layer 74 of the read head also serve as the bottom pole layer for the write head, as will be explained in more detail hereinafter.

Figure 5:
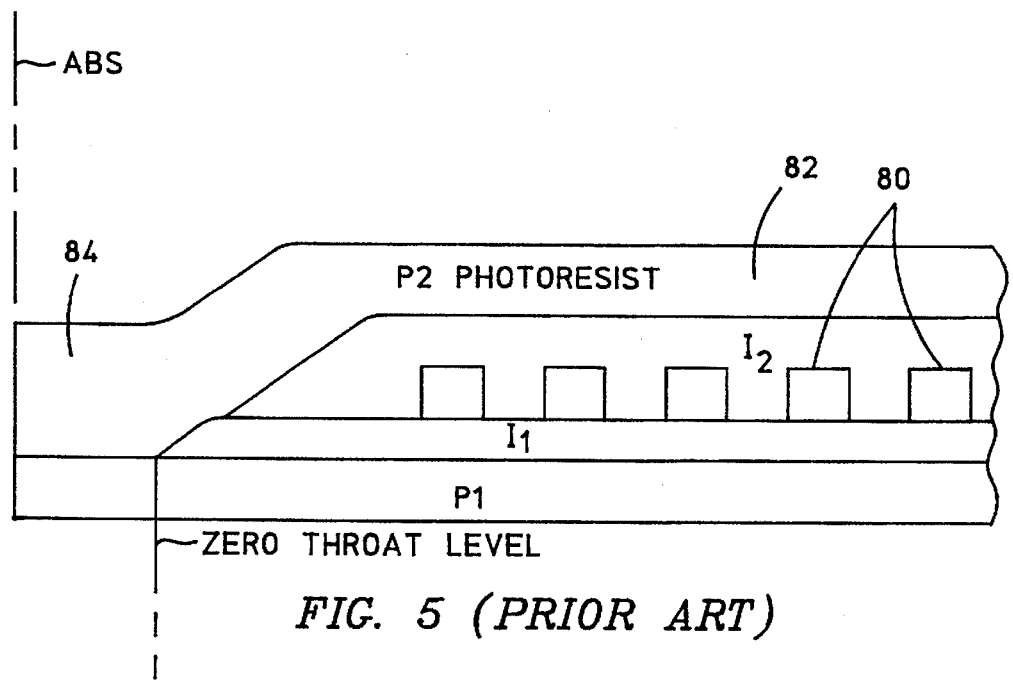
FIGS. 5 and 6 are schematic illustrations of a front portion of a prior art thin film magnetic write head.
Figure 6:
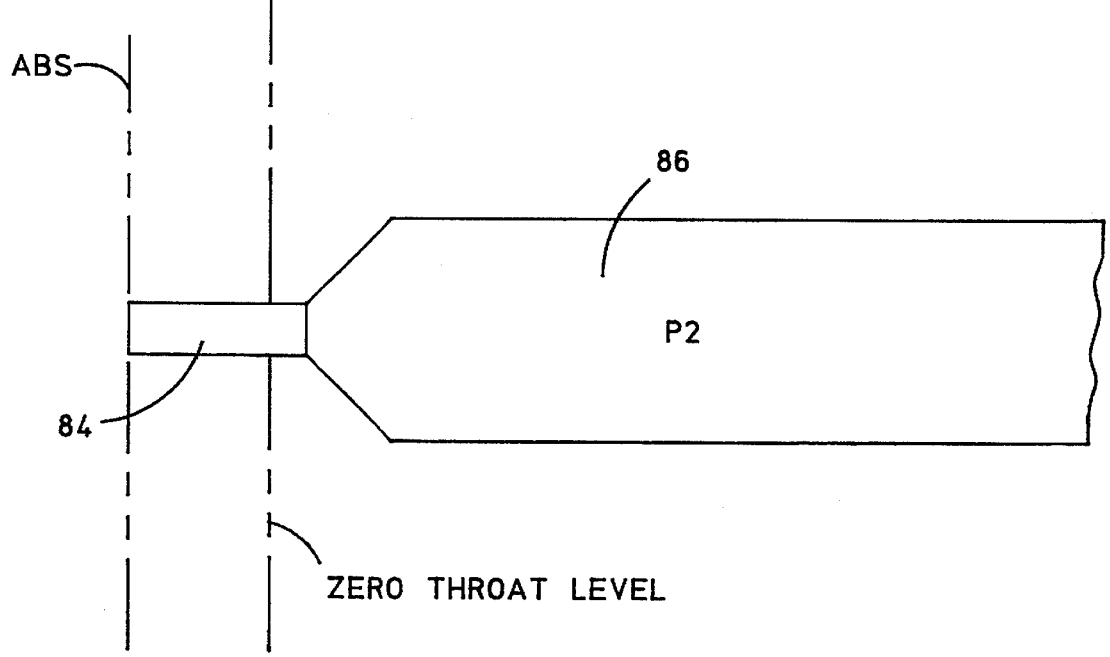

There is illustrated in FIGS. 5 and 6 the pole tip region of a prior art thin film magnetic write head which has an air bearing surface (ABS) and a zero throat level. In the prior art, the top pole layer is typically formed after forming an insulation layer $I_1$ below and one or more insulation layers $I_2$ at and above the coil layer 80. A thick photoresist layer 82 is used to configure the P2 pole layer, including a pole tip portion in the pole tip region 84. The thickness of the photoresist layer 82 in the pole tip region 84 prevents the formation of a well-defined mask. The thinner the resist layer, the better the mask since there is less light scattering during the photolithography step. The smallest trackwidth obtainable with this prior art approach is approximately 2 microns for a 4 micron thick pole layer. As can be seen from FIG. 6, the finally formed top pole layer 86 necks down to the pole tip region 84 at a location back of the zero throat level. Consequently, the pole tip of this layer has a neck portion between the zero throat level and the flared portion of the top pole layer 86, which saturates the pole tip at relatively low write current levels.

Figure 7:
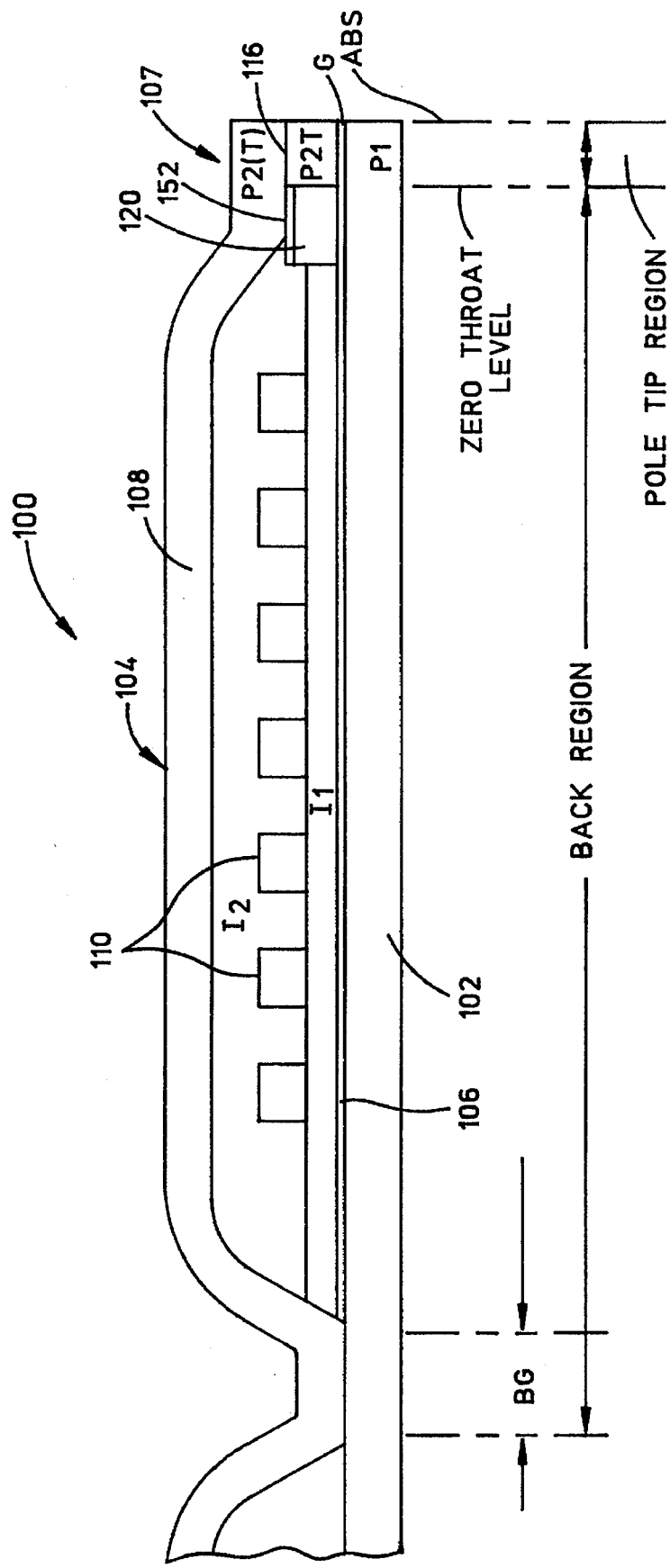
FIG. 7 is a schematic longitudinal cross-sectional view of a first embodiment of a thin film magnetic write head constructed according to the present invention.

FIG. 7 illustrates one embodiment 100 of the thin fill magnetic write head of the present invention. The write head has a pole tip region 107 which is located between an air bearing surface (ABS) and a zero throat level, and a back region which extends from the zero throat level back to and including a back gap (BG). The head includes top and bottom pole layers of magnetic material 102 and 104 which transition to the pole tip region 107. The pole layers 102 and 104 are connected together at the back gap (BG). Between the top and bottom pole layers 102 and 104 are a first insulation layer $I_1$, a coil 110 with rams, and one or more insulation layers $I_2$. As shown in FIGS. 3 and 4, a first lead 112 is connected to one end of the coil 110 at 113 and a second lead 114 is connected to the other end of the coil (not shown). When a varying current is fed to the coil 110 through the leads 112 and 114, flux reversals are induced into the top and bottom pole layers 102 and 104. These flux reversals extend across a gap G in the pole tip region 107 formed by a gap layer 106, as illustrated in FIG. 7, through the ABS and into a moving magnetic medium for writing dam. The number of flux reversals per millimeter length of the track of the magnetic medium defines the linear density or bit density of the head. This depends upon the thickness of the gap G. The number of tracks per width of the magnetic medium (TPI) depends upon the width of the pole tip region 107. The invention provides a unique thin fill magnetic write head and a method for making it, each of which provides a submicron trackwidth.

As shown in FIGS. 7, 8A, 8B and 8C, a first embodiment of the thin fill magnetic write head 100 includes a notch structure 120 on the gap layer 106. This notch structure is left in the write head 100 during its fabrication. The notch structure preferably is a generally U-shaped layer with top and bottom surfaces 120T and 120B. The thickness of this layer determines the overall thickness of one or more pole tip layers, which will be described in more detail hereinafter. This thickness will usually range from 2 to 3 microns.

Figure 8A:
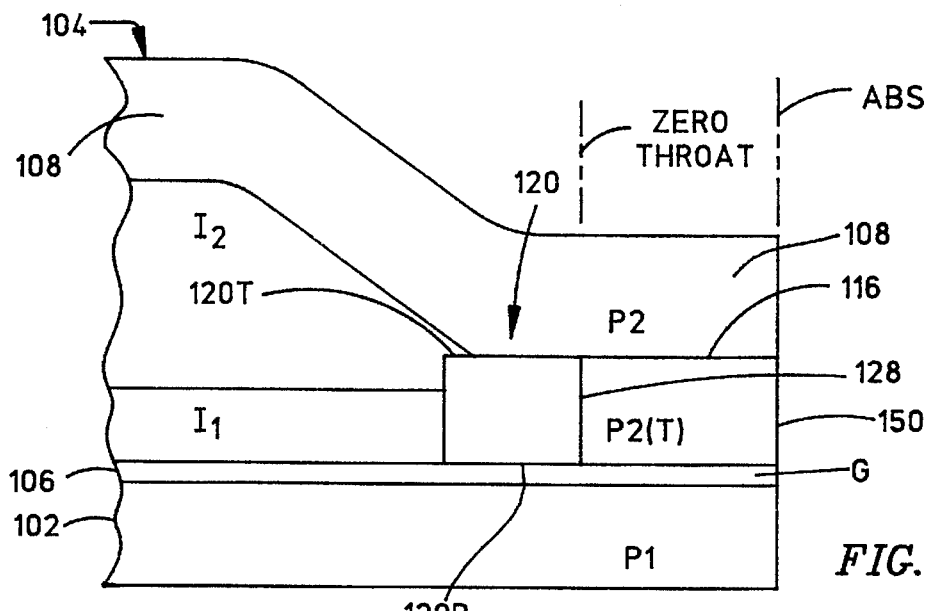
FIG. 8A is an enlarged view of the pole tip portion of the first embodiment illustrated in FIG. 7.
Figure 8B:
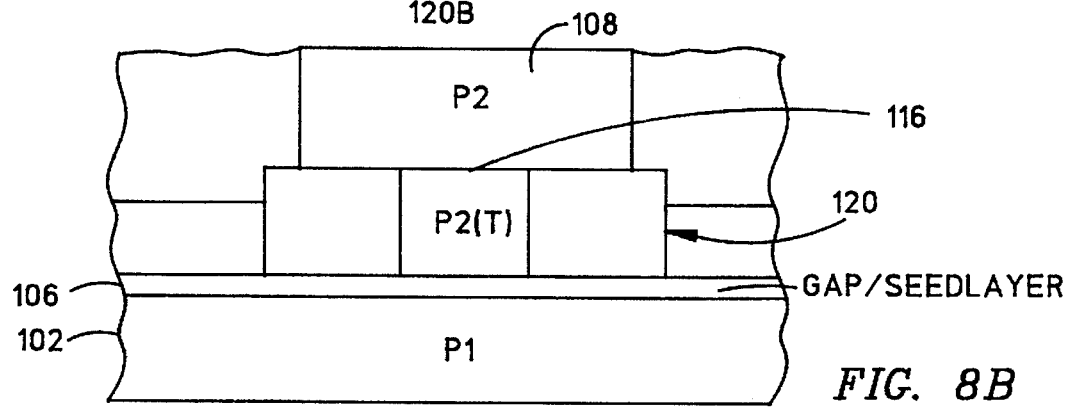
FIG. 8B is a view of the pole tip region illustrated in FIG. 8A after rotation by 90°.
Figure 8C:
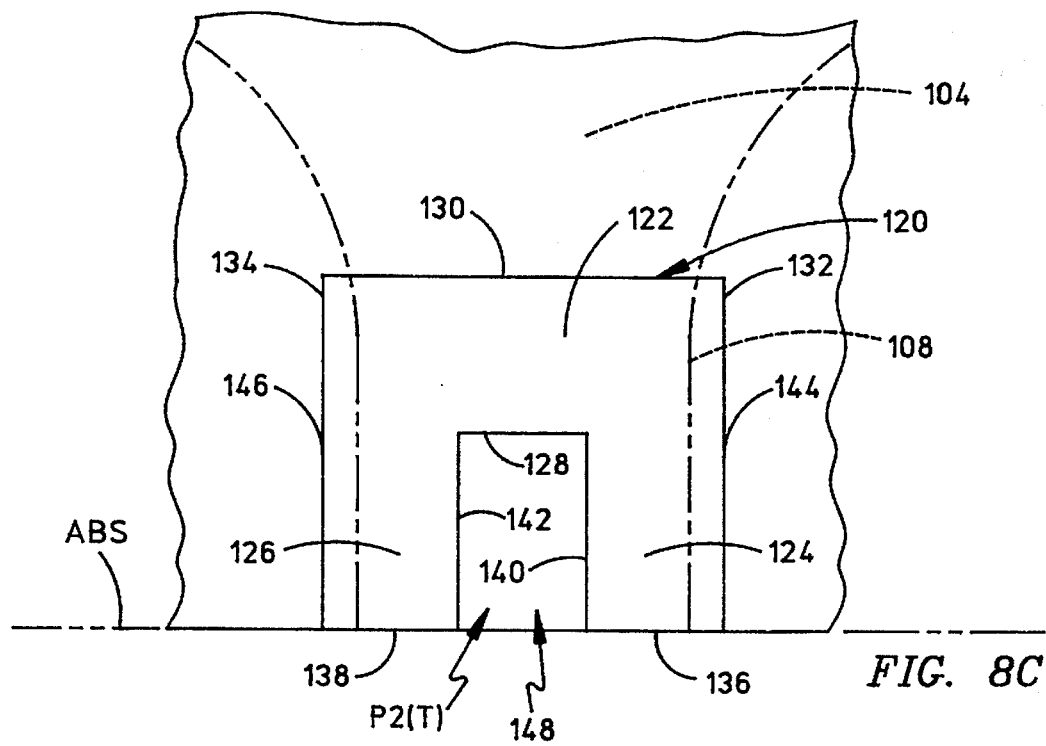
FIG. 8C is a top planar view of the pole tip region illustrated in FIG. 8A.

As shown in FIG. 8C, the notch structure 120 has a base 122 and a pair of legs 124 and 126. The base has an inside front surface 128, an outside back surface 130 and a pair of outside side surfaces 132 and 134. The legs 124 and 126 have outside front surfaces 136 and 138, inside side surfaces 140 and 142, and outside side surfaces 144 and 146, respectively. The outside side surfaces 132 and 134 of the base are contiguous with the outside side surfaces 144 and 146, respectively, of the legs. The front surfaces 136 and 138 of the legs lie in a common plane which includes a slider surface (not shown) and forms a part of the air bearing surface.

The front surface 128 of the base and the inside side surfaces 140 and 142 of the legs form a trench 148 inside the U-shape of the mask. The trench 148 provides a location where one or more pole tip portions are located.

In the embodiment shown in FIGS. 7, 8A, 8B, and 8C, only one pole tip layer, P2(T), is located in the trench 148. The pole tip layer P2(T) has a front surface 150 (see FIG. 8A) which lies in the plane that forms a part of the air bearing surface. The pole tip layer P2(T) is positioned beneath a portion 108 of the top pole layer 104 in the pole tip region 107. In this embodiment, the gap layer 106 is formed directly on top of the bottom pole layer 102. Preferably, in all embodiments, the gap layer 106 is a non-magnetic conductive material which also serves as a seedlayer for plating one or more pole tip layers. Suitable gap/seedlayer materials are nickel phosphorus, nickel molybdenum, nickel chromium, nickel tungsten, gold, and copper. The gap/seedlayer can terminate at the back surface 130 of the mask 120 or can continue back to the back gap, as illustrated in FIG. 7. As shown, the second shield layer 74 (see FIG. 3) of the read head may be the same entity as the bottom pole layer 102.

Figure 9A:
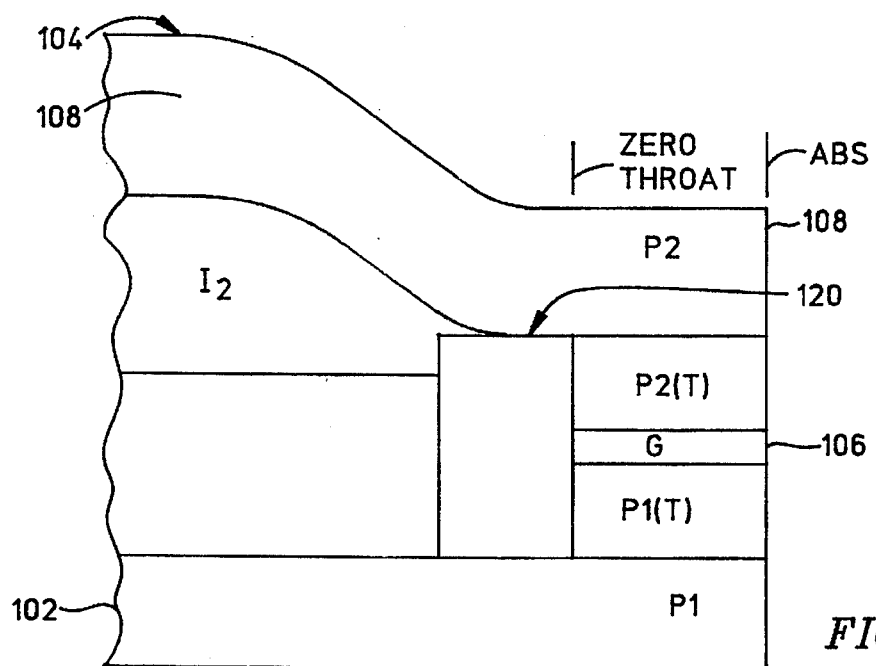
FIG. 9A is a schematic cross-sectional view of the pole tip region of a second embodiment of a thin film magnetic write head constructed according to the present invention.
Figure 9B:
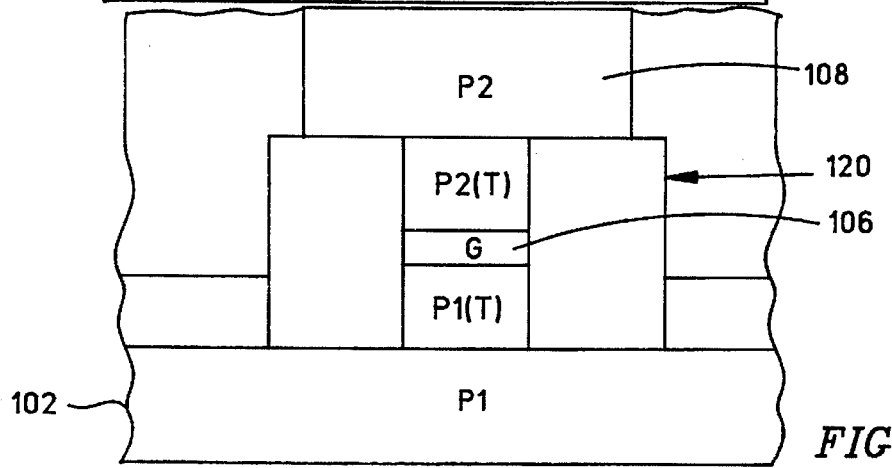
FIG. 9B is a view of the portion of the pole tip region illustrated in FIG. 9A which forms the air bearing surface.
Figure 9C:
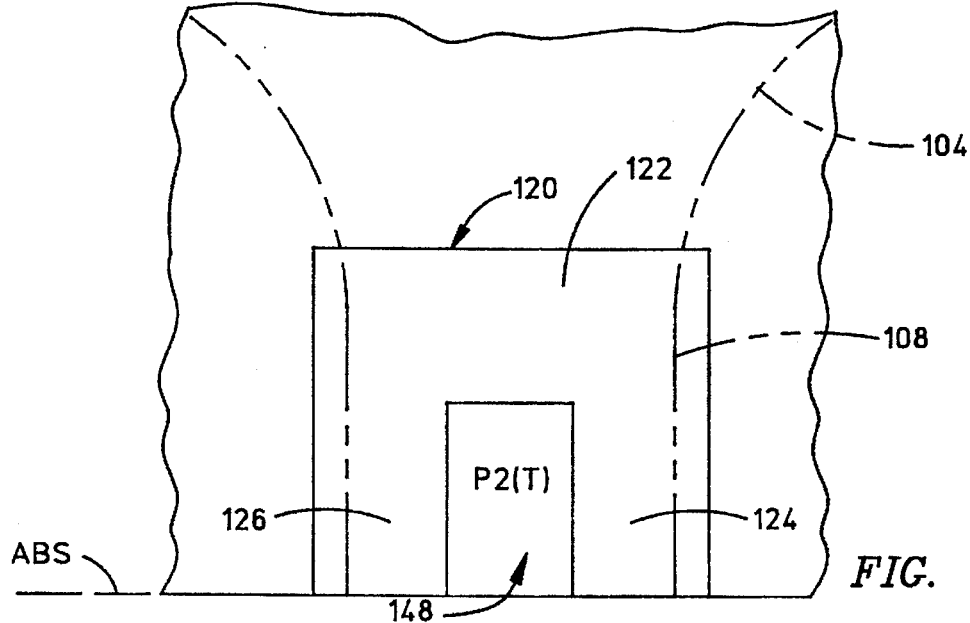
FIG. 9C is a top planar illustration of the pole tip region illustrated in FIG. 9A.

A second embodiment of the invention is illustrated in FIGS. 9A, 9B, and 9C. The notch structure 120 in this embodiment is the same as the notch structure in the first embodiment except it is higher (a thicker layer) to accommodate a plurality of pole tip layers in the trench 148. In this embodiment, a pole tip layer P1(T) is provided in magnetic contact with the bottom pole layer 102. Next, a conductive gap layer G is deposited in the trench by electrodeposition. Finally, a magnetic layer under the top pole layer 104 is located in the trench 148 to form a pole tip layer P2(T).

The first embodiment shown in FIGS. 7, 8A, 8B, and 8C has an advantage over the second embodiment shown in FIGS. 9A, 9B, and 9C: it is easier to fabricate. The first embodiment has one less layer to make. However, because of the wide expanse of the bottom pole layer 102, as seen in FIG. 8B, there is some off-track flux leakage between the pole tip layer P2(T) and the bottom pole layer 102 which might account for some side writing by the head. In contrast, the second embodiment shown in FIGS. 9A, 9B, and 9C has two pole tip layers P1(T) and P2(T) symmetrically located with respect to the gap layer G. Flux transfer in this embodiment will be straighter across with less side writing.

As shown in FIGS. 7, 8A and 8B, the pole tip layer P2(T) is magnetically connected to the top pole layer (P2) 104 at 116. The front surface of the pole tip layer P2(T) and the front surface of the pole tip portion 108 of the top pole layer 104 both lie in the plane which forms the air bearing surface. In this embodiment, the front surface of the bottom pole layer 102 also lies in the plane of the air bearing surface.

In the second embodiment shown in FIGS. 9A, 9B, and 9C, the front surface of the forward extension 108, the front surface of pole tip layer P2(T), the front surface of the gap layer 106, the from surface of the pole tip layer P1(T), and the front surface of the bottom layer 102 all lie in the plane of the air bearing surface.

A significant feature of the invention is that the pole tip region within the trench is narrow, providing a narrow trackwidth. However, the wider portion 108 at the P2 pole layer is in contact with, and is magnetically parallel to, the pole tip layer from the ABS to the zero throat level, providing additional flux-conducting capacity and preventing saturation of the head at high write currents. Furthermore, the height of the notch structure planarizes the structure of the head, separating the top pole layer 104 from the write gap so as to minimize flux leakage from the top pole layer to the bottom pole layer at the ABS.

It is important that the material of the notch structure 120 be anisotropically etchable. Suitable materials for this purpose are silicon dioxide, silicon, silicon nitride and carbon. To enhance the etching of the notch structure 120, a top U-shaped layer 152 is employed (see FIG. 7). The material of this layer 152 is non-anisotropically etchable. Suitable materials for this purpose include photoresist, metal, and aluminum oxide. The layer 152 stays in the head during the processing steps along with the notch structure 120 and forms a part of the final head.

Method of Making the Thin Film Magnetic Head

Figure 10:
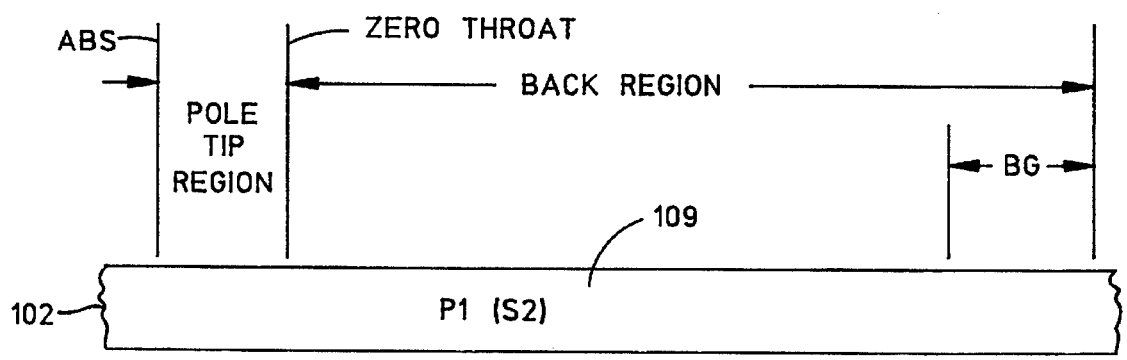
FIGS. 10 through 21 are schematic illustrations representing process steps executed in the construction of the thin film magnetic write head of the present invention.
Figure 11:
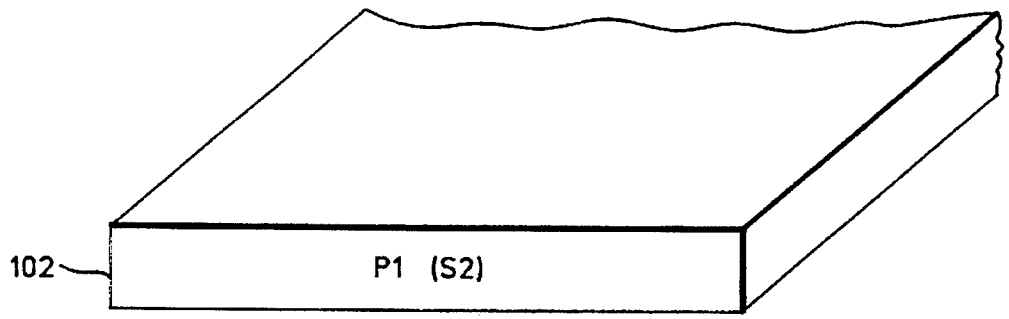
Figure 12:
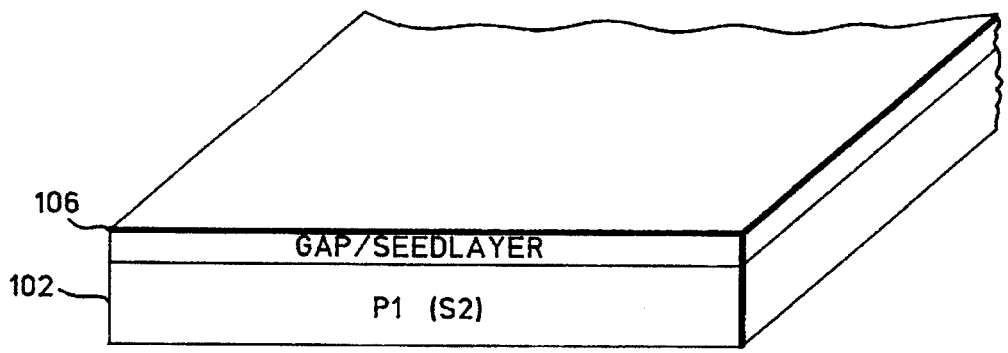

FIGS. 10 through 20 show the sequence of process steps for making the first embodiment of the thin film magnetic head shown in FIGS. 7, 8A, 8B, and 8C. As shown in FIGS. 10 and 11, the bottom pole layer 102 is formed from a known magnetic material, the bottom pole layer having a pole tip portion in the pole tip region and a back portion in the back region BG. As discussed hereinabove, in a merged head, the bottom pole layer 102 may comprise the second shield layer 74 of a magnetoresistive read head, as seen in FIG. 3. As shown in FIG. 12, a non-magnetic conductive gap/seedlayer 106 is formed on top of the bottom pole layer 102. The materials that are suitable for the gap/seedlayer have been discussed hereinabove. The gap/seedlayer serves two purposes. It provides a gap G for the subsequently formed pole tip and also serves as a seedlayer for plating the magnetic pole tip layer P2(T) in the pole tip region.

Figure 13:
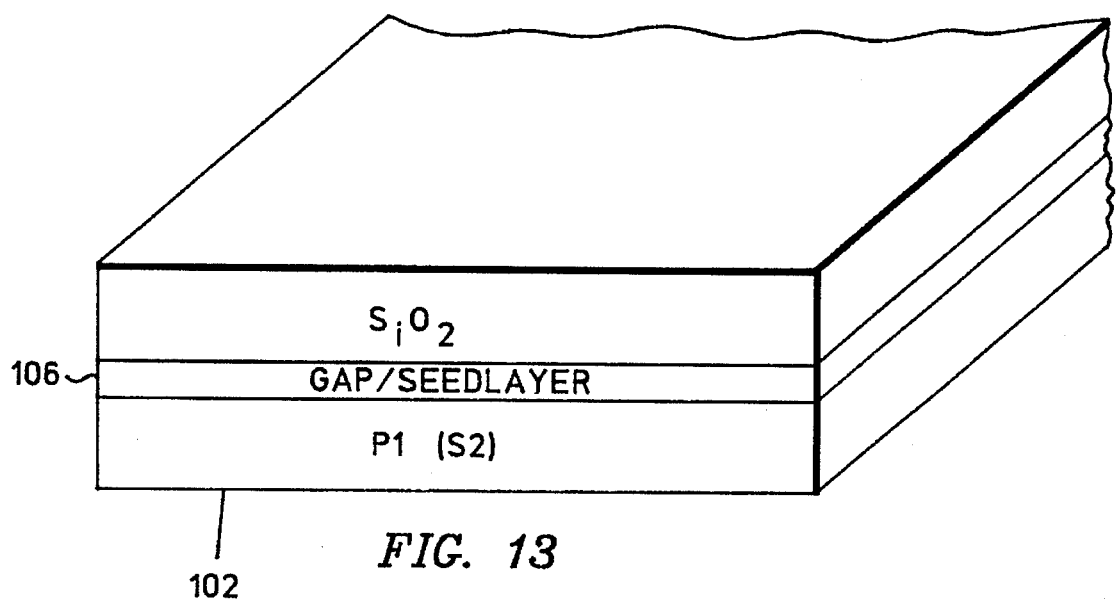
Figure 14:
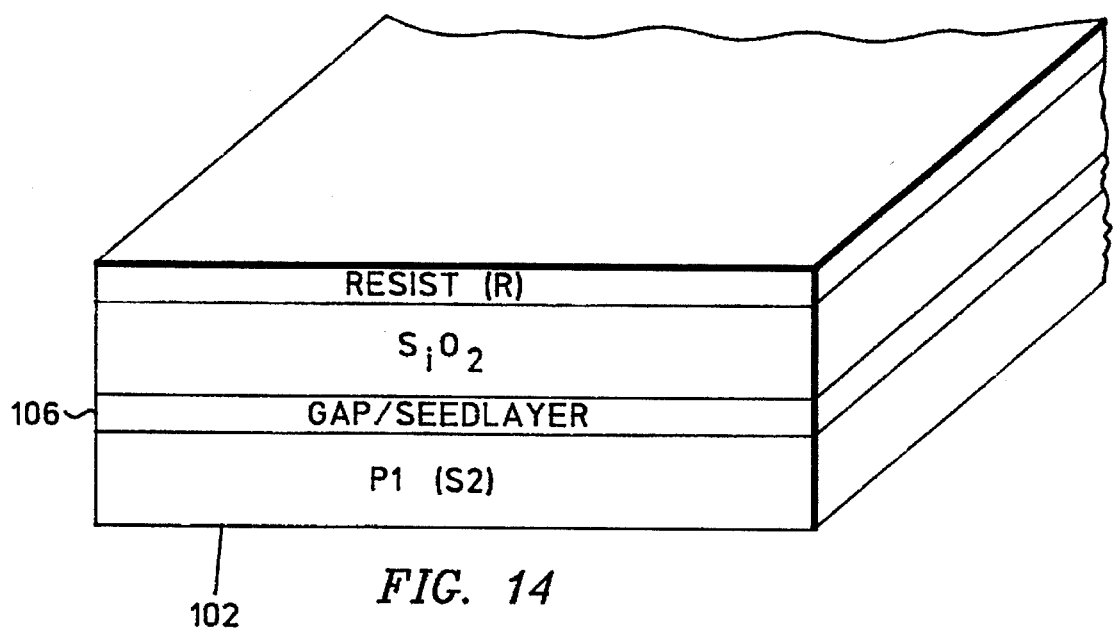
Figure 15:
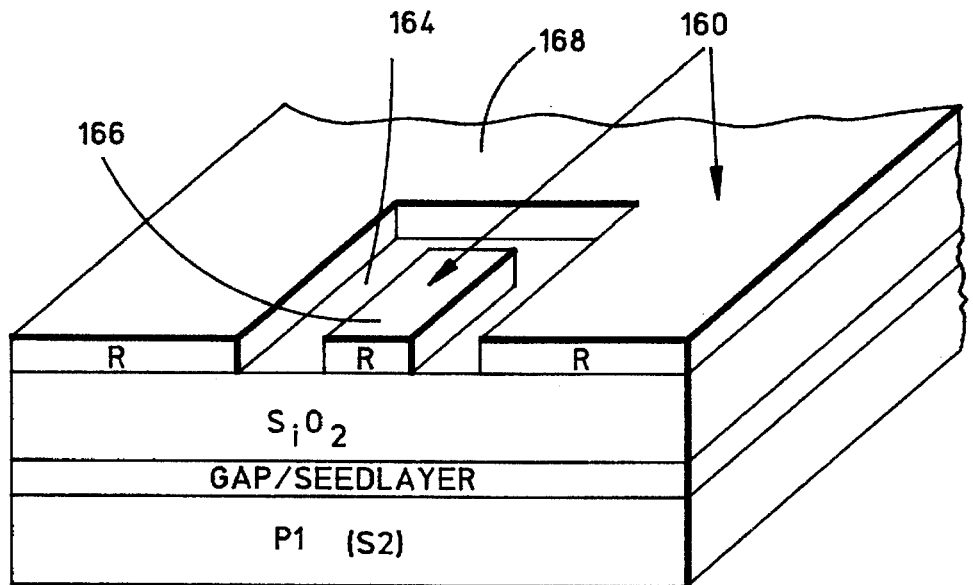

As shown in FIG. 13, an anisotropically etchable layer, such as silicon dioxide, is formed on top of the gap/seedlayer. This layer should be of a thickness that equals the thickness or combined thicknesses of one or more pole tip layers which will be subsequently formed. As shown in FIG. 14, a photoresist layer is formed on top of the silicon dioxide layer. This photoresist layer is submicron, namely in the order of 0.7 to 0.8 microns. Because of this thinness, light directed onto the resist layer during photo-masking has little chance to scatter, thereby providing a well-defined photoresist mask at 160 in FIG. 15. The photoresist mask leaves a U-shaped portion of the top surface 164 of the silicon dioxide layer exposed. This U-shaped portion is configured to enclose the pole tip region. The pole tip region is covered by a thin photoresist layer 166 which is directly on top of the volume where one or more pole tip layers are to be formed and which is symmetrically located within the U-shape of the remainder of the photoresist mask 168.

Figure 16:
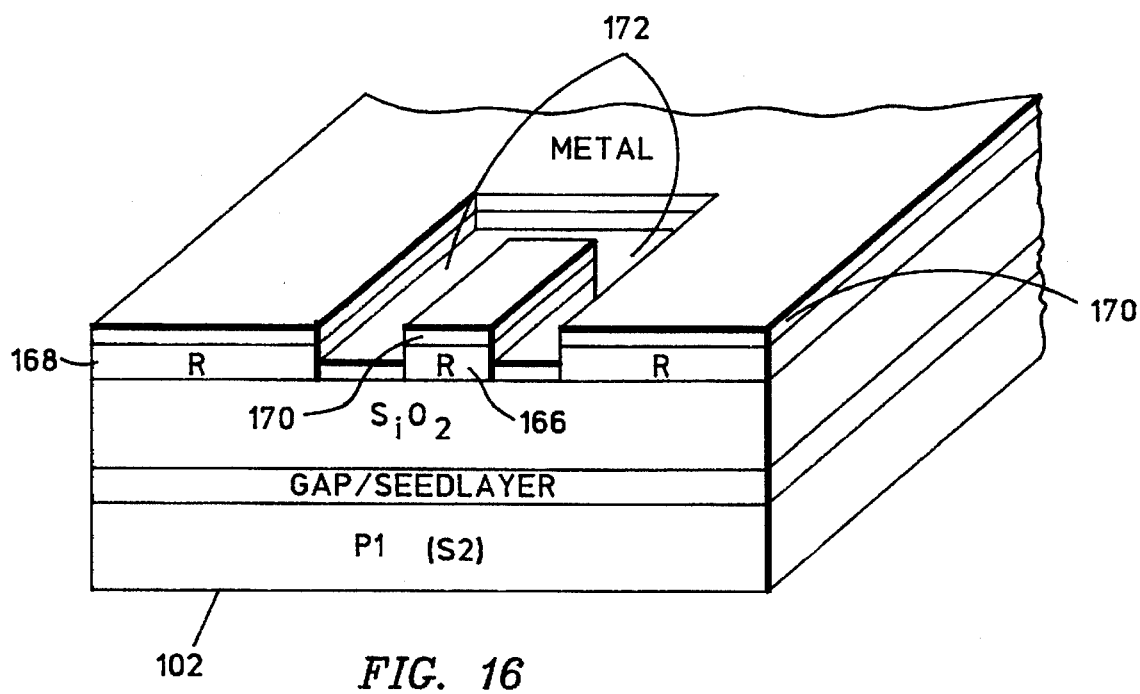
Figure 17:
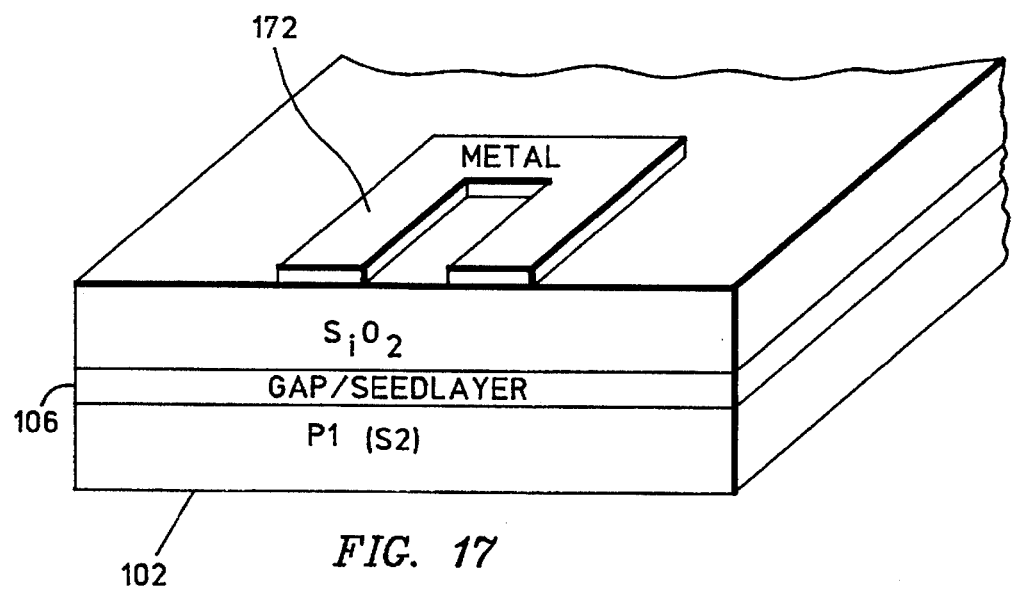

As shown in FIG. 16, a very thin non-anisotropically etchable layer 170 is laid over the entire wafer. The thickness of this layer may be on the order of 0.1 micron. Materials suitable for this layer have been discussed hereinabove. Hereinafter this layer 170 will be referred to as a metal layer. It should be noted that a majority of the metal layer 170 is formed on top of the photoresist layers 166 and 168. A very important portion of this metal layer, however, is formed in a U-shape 172 on top of the silicon dioxide layer. FIG. 17 illustrates the configuration of the partially completed head after the photoresist layers in FIG. 14 are developed and removed by a solution. This leaves the U-shaped metal layer 172 located about the pole tip volume to be subsequently formed.

Figure 18:
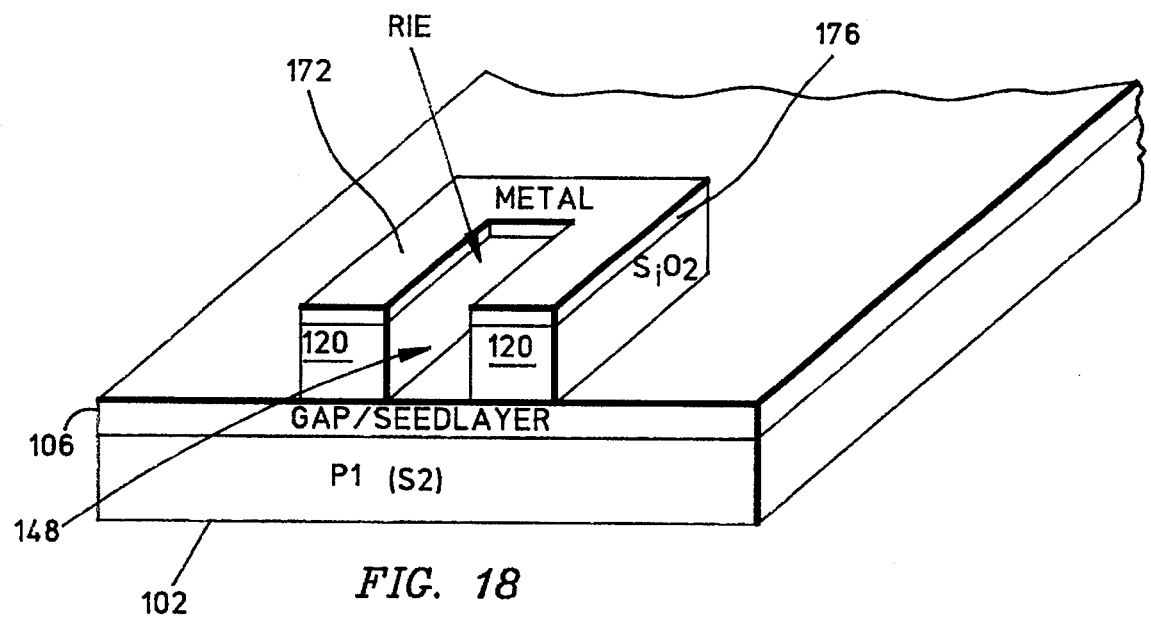

As shown in FIG. 18, the wafer is then subjected to reactive ion-etching (RIE) which removes the silicon dioxide layer down to the gap/seedlayer except for the U-shaped silicon dioxide layer 176 which forms the desired notch structure 120. This notch structure also includes the very thin top U-shaped metal layer 172. The total notch structure, including the silicon dioxide layer 176 and the metal layer 172, is left in the head to form a part of the final product. The U-shaped notch structure 120 provides a trench 148 for the subsequent forming of one or more pole tip layers.

Figure 19:
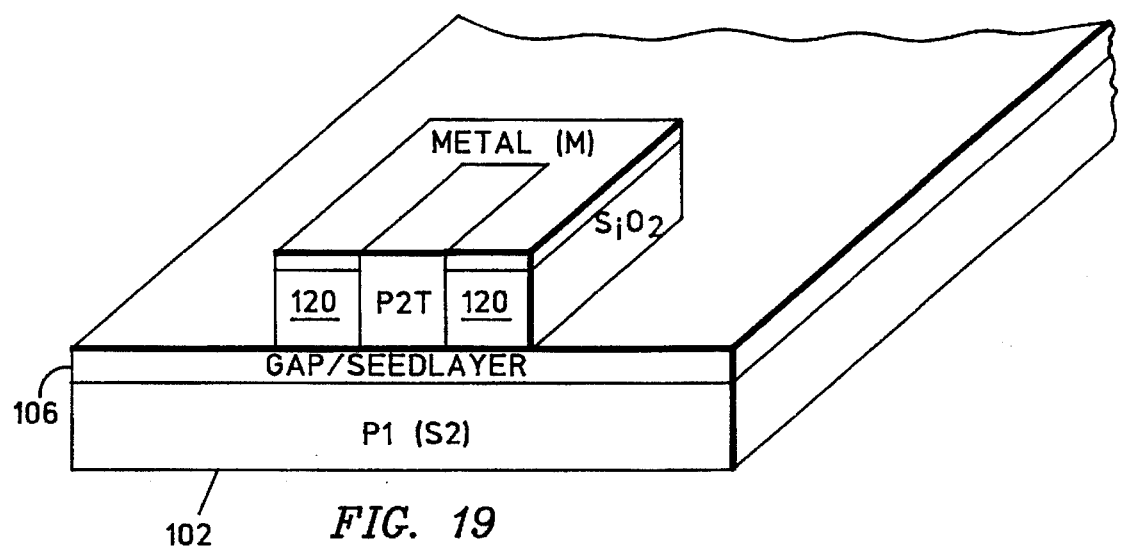

In the first embodiment of the invention, shown in FIGS. 7, 8A, 8B, and 8C, a single pole tip layer P2(T) is formed in the trench 148. This is shown in FIG. 19. This pole tip layer P2(T) is essentially a magnetic layer which is magnetically continuous with the top pole layer 104, shown in FIG. 7. In this embodiment the gap/seedlayer 106 serves as the gap G for the pole tip.

As shown in FIG. 7, before formation of the top pole layer 104, a first insulation layer $I_1$, a coil layer and one or more insulation layers $I_2$ are formed in the area between the zero throat level and the back gap. The notch structure 120 provides a form for these layers, keeping them away from the zero throat level and also promoting planarization of the head.

Figure 20:
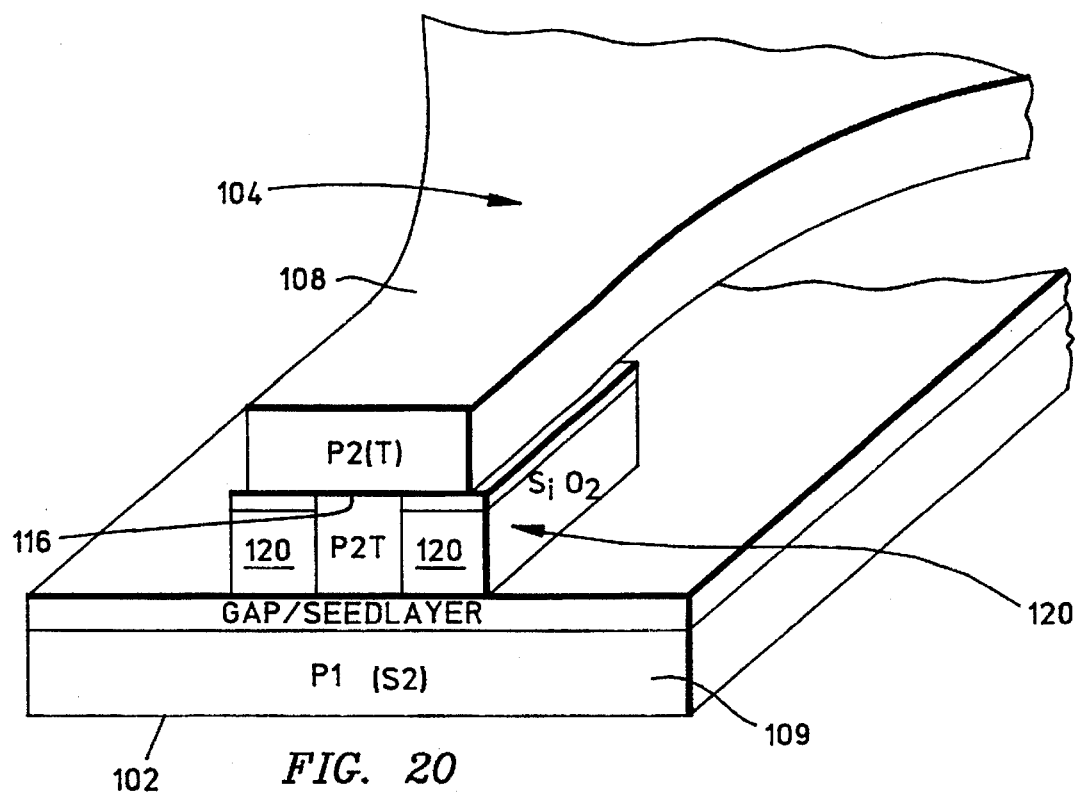

As shown in FIG. 20, the top pole layer 104 transitions to the portion 108 in the pole tip region. The width of this portion should be less than the width of the notch structure 120 so that it finds proper support. The formation of the top pole layer 104 stitches the front portion 108 of the top layer to the pole tip layer P2(T) at 116 shown in FIGS. 7 and 20. When the top pole layer 104 is formed, it is magnetically connected to the bottom pole layer 102 at the back gap. To make this connection, it may be desirable to form a via at the back gap by one or more etching steps. The forming of the second shield layer 74 of the read head may comprise the same step as forming the bottom pole layer 102. Suitable magnetic materials may include, for example, nickel iron. FIG. 20 shows an ABS view of the first embodiment of the present invention with all of the pole tip components P1, gap, P2, and P2(T) having front surfaces which lie in a plane which forms the air bearing surface.

Figure 21:
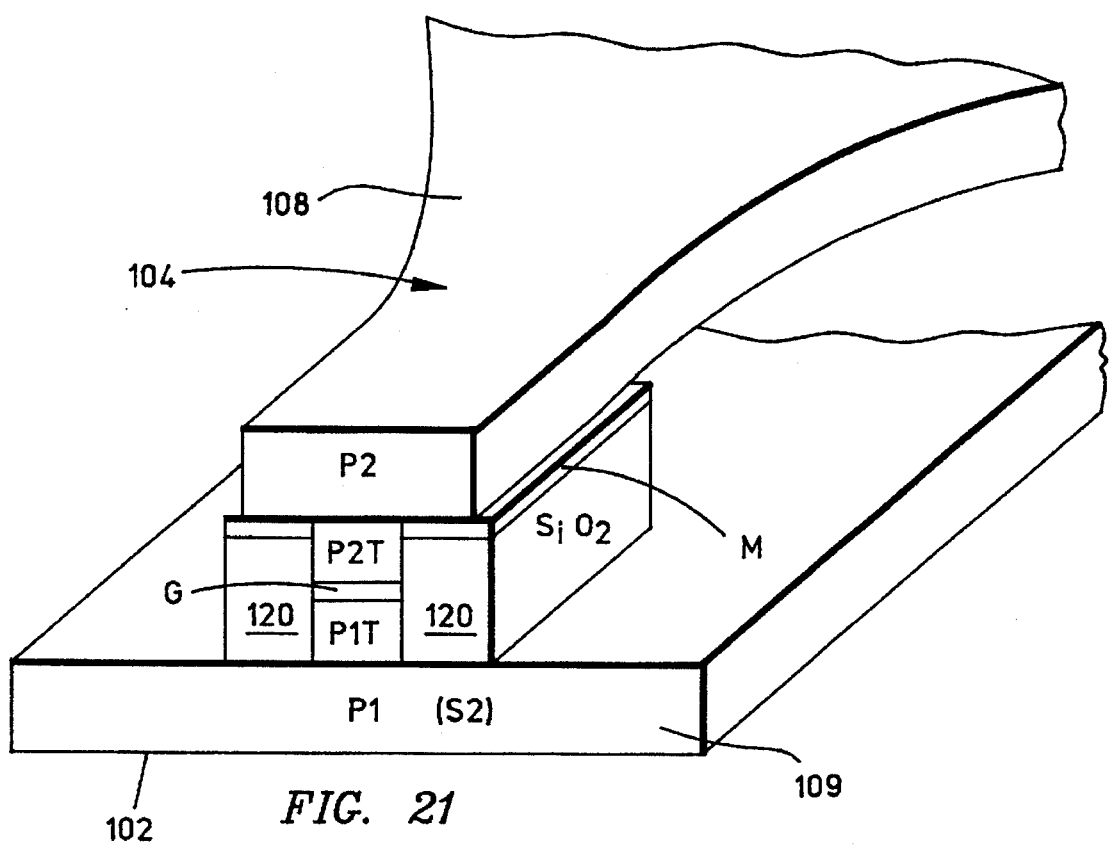

The second embodiment of the invention, which is illustrated in FIGS. 9A, 9B and 9C, is constructed as shown in FIG. 21. In this embodiment, multiple layers are constructed within the trench 148. In this instance, a magnetic layer is formed in the trench to form a pole tip layer P1(T), a non-magnetic layer is formed in the trench to form a gap layer G, and a magnetic layer is formed in the trench to form a pole tip layer P2(T).

Figure 22:
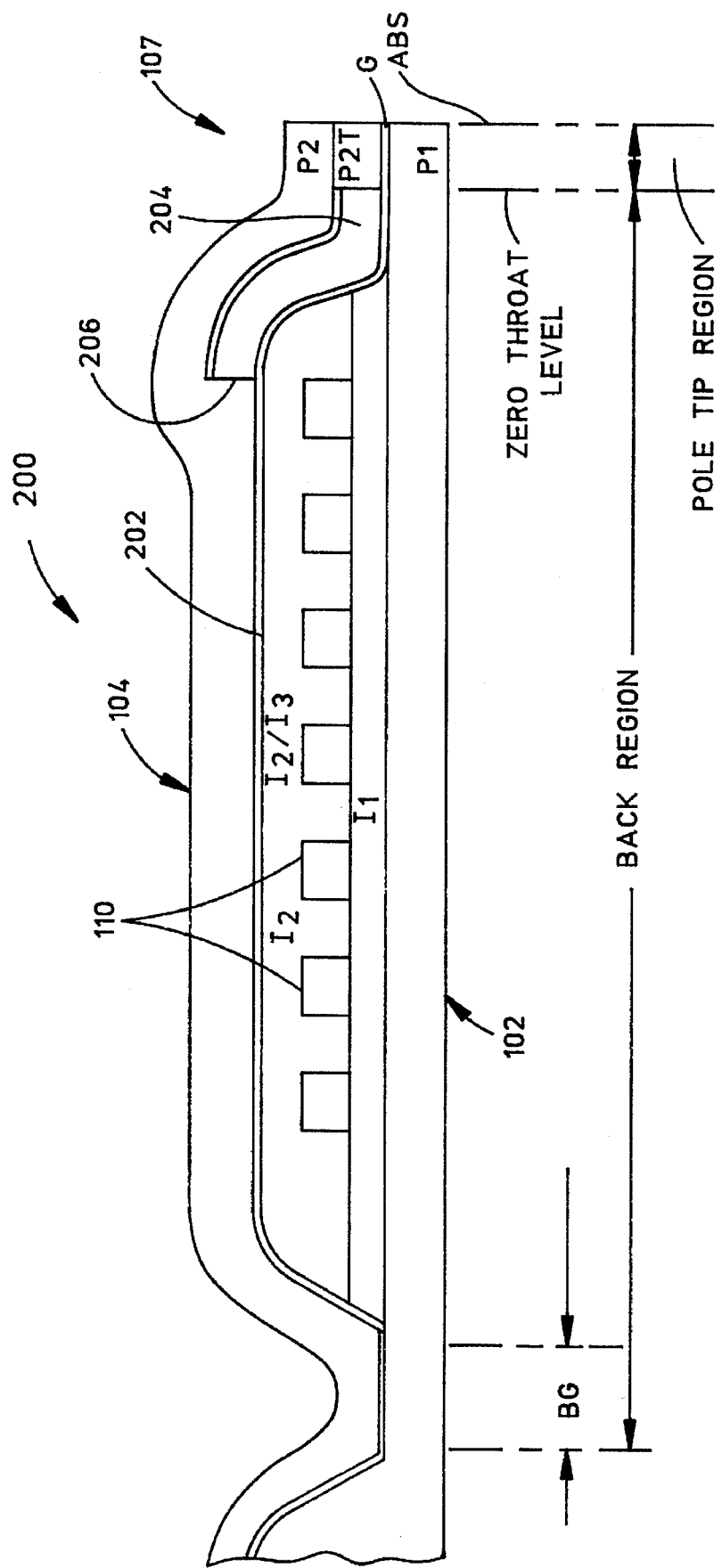
FIG. 22 is a schematic longitudinal cross-sectional view of another embodiment of a thin film magnetic head constructed according to the invention.

Another embodiment 200 of the invention is illustrated in FIG. 22. This embodiment is similar to the first embodiment 100 of the invention illustrated in FIG. 7, except that the embodiment 200 has structural elements which simplify the making of the magnetic write head. As shown in FIG. 22, the primary structural difference of the embodiment 200 of the magnetic head is that a non-magnetic conductive layer 202 is formed at G on top of the first pole 102 in the pole tip region and on top of one or more insulation layers $I_2/I_3$ in the back region between the zero throat level and the back gap. This layer 202 serves as a gap G for the pole tip region as well as a seedlayer all the way from the ABS to the back gap. Material suitable for such a gap/seedlayer have been discussed hereinabove. The embodiment 200 also has a notch structure 204 which is similar to the notch structure 120 of the embodiment 100 shown in FIG. 7. The difference in the notch structure 204 is that it is formed over a forward portion of the insulation layers $I_1/I_2/I_3$. The reason that the notch structure 204 has been extended in the back region is to smooth out the unevenness of the forward junctions of the aforementioned insulation layers so that the second pole 104 has a smooth transition from the pole tip region into the back region of the magnetic head structure. As shown in FIG. 22, once the notch structure 204 reaches the top plane of the insulation layers $I_2/I_3$, it can be terminated at 206. An ABS view of the magnetic head 200, shown in FIG. 22, is similar to that illustrated in FIG. 8b, except the short line 116 between P2 and P2(T) would be eliminated.

Figure 23:
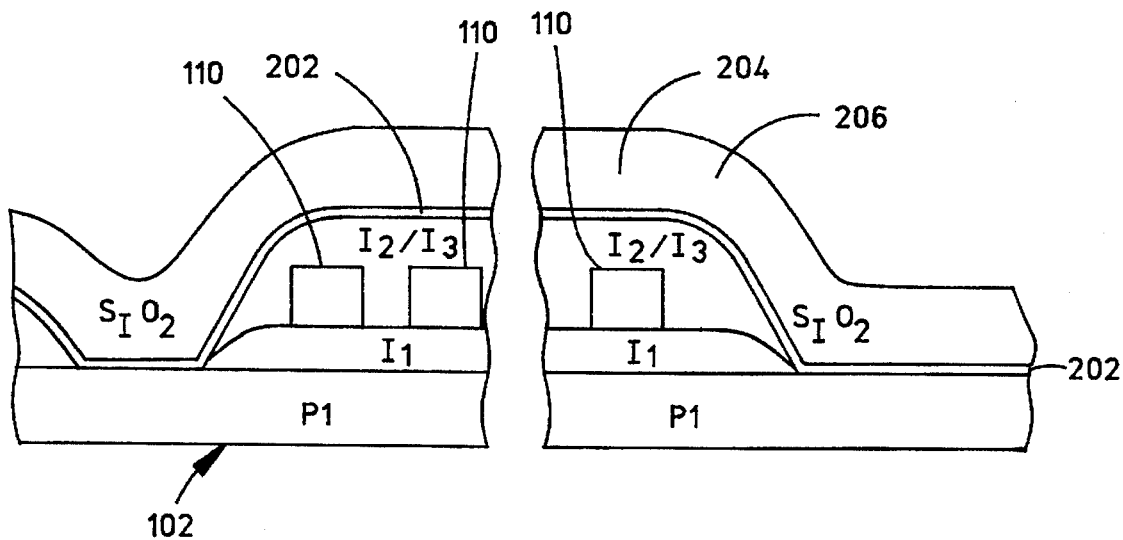
FIGS. 23 through 28 are schematic illustrations representing process steps executed in the construction of the thin film head shown in FIG. 22.
Figure 24:
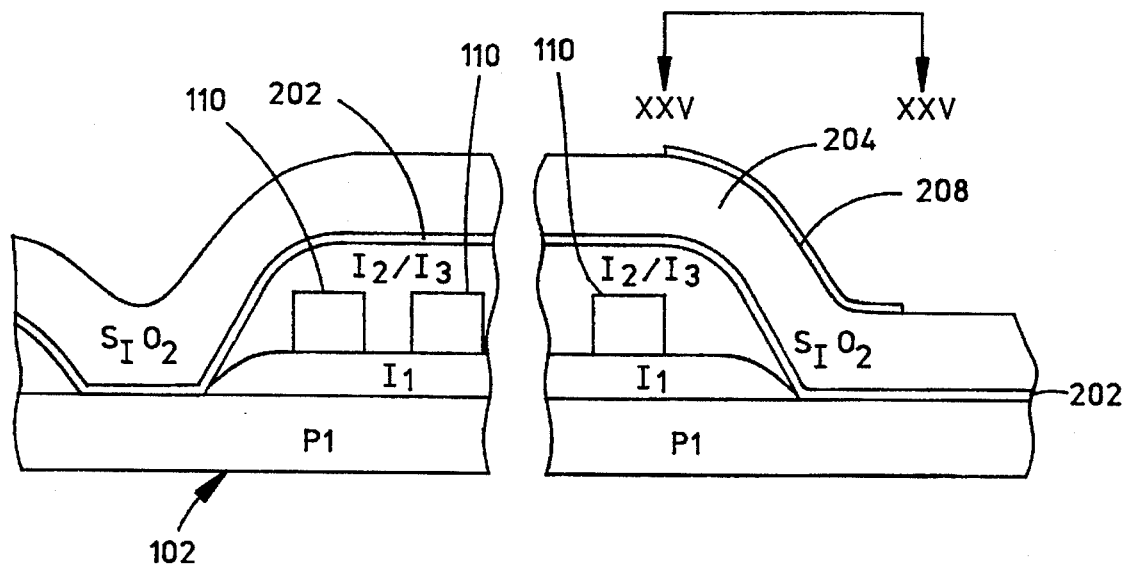

An exemplary method of making the magnetic write head 200 of FIG. 22 is illustrated in FIGS. 23 through 28. Similar to the prior method, a first pole magnetic layer 102 is formed as illustrated in FIG. 23. The next steps are to form the $I_1$ layer on top of the first pole layer 102, deposit the coil structure 110 on top of the first insulation layer $I_1$ and deposit one or more insulation layers $I_2/I_3$ on top of the coil structure 110. The formation of these layers differs from the method of making the embodiment 100, shown in FIG. 7, in that these layers are deposited after the deposition of the first pole layer 102. In the prior method, these layers $I_1$, 110 and $I_2/I_3$ were deposited after the formation of the notch structure 176 illustrated in FIG. 18. After depositing the $I_1$, 110, and $I_2/I_3$ layers, the gap/seedlayer 202 is deposited on top of the first pole layer 102 in the pole tip region and on top of the layers $I_1$, 110 and $I_2/I_3$ as illustrated in FIG. 23. The gap/seedlayer 202 may extend on top of the layers $I_1$, 110, and $I_2/I_3$ between the zero throat level and the back gap and optionally may extend into the back gap and therebeyond as illustrated in FIG. 23. The next step is to deposit an isotropically etchable layer 204, such as silicon dioxide, over the gap/seedlayer 202, as illustrated in FIG. 23. This is a similar step to the formation of the silicon dioxide layer shown in FIG. 13 for the first method.

Figure 25:
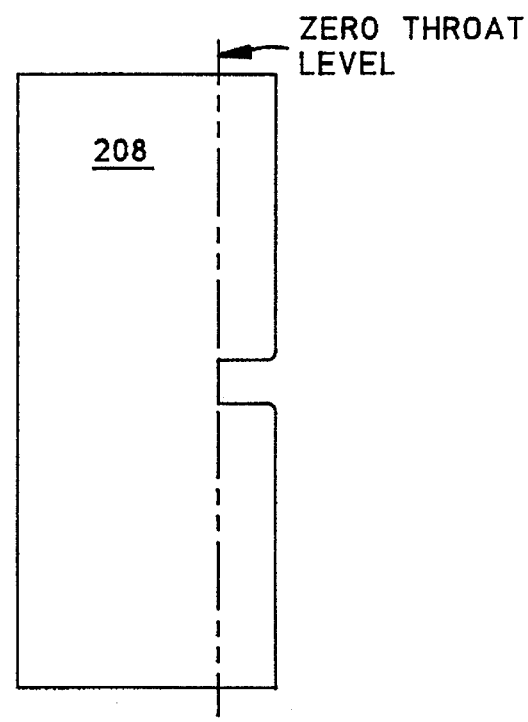
Figure 26:
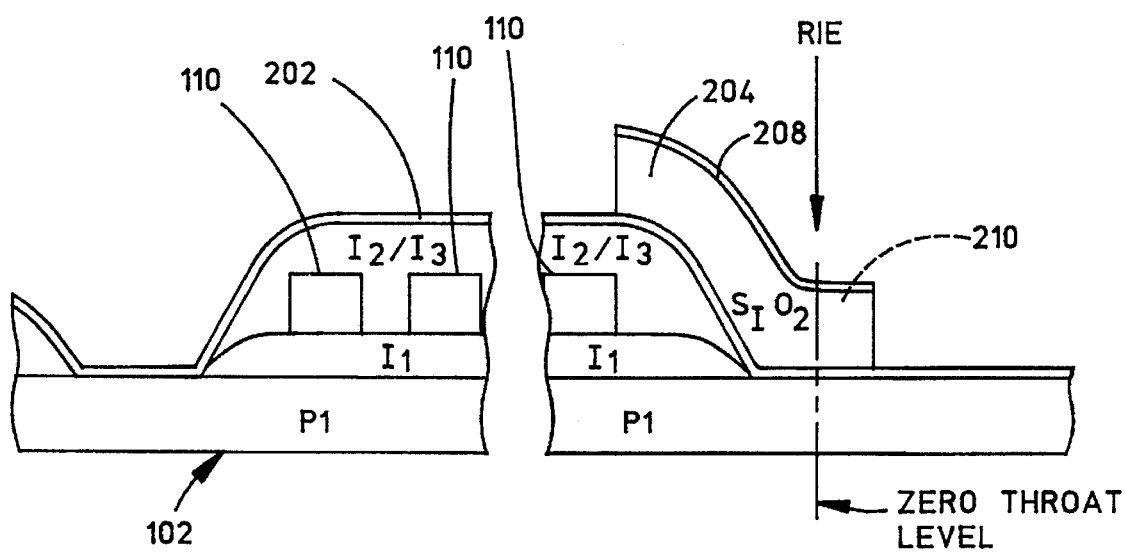

The next step is to form a thin U-shaped non-anisotropically etchable layer 208 on top of the silicon dioxide layer 206. This U-shape is illustrated in FIG. 25. The formation of this U-shaped layer 208 may be formed by the aforementioned steps described for the first method as illustrated in FIGS. 14 through 17. Materials suitable for the layer 208 have been described hereinabove. The next step is to employ the U-shaped layer 208 as a mask for forming a trench 210 in the silicon dioxide layer 204 therebelow. This step is illustrated in FIG. 26. The preferred method for forming this trench 210 is to subject the wafer to reactive ion etching (RIE). The trench 210 formed in the silicon dioxide layer 204 will be similar to the trench 148 shown in FIG. 18 for the first embodiment. The reactive ion etching will also remove the silicon dioxide layer forward, back, and on both sides of the layer 208 to provide the configuration illustrated in FIG. 26.

Figure 27:
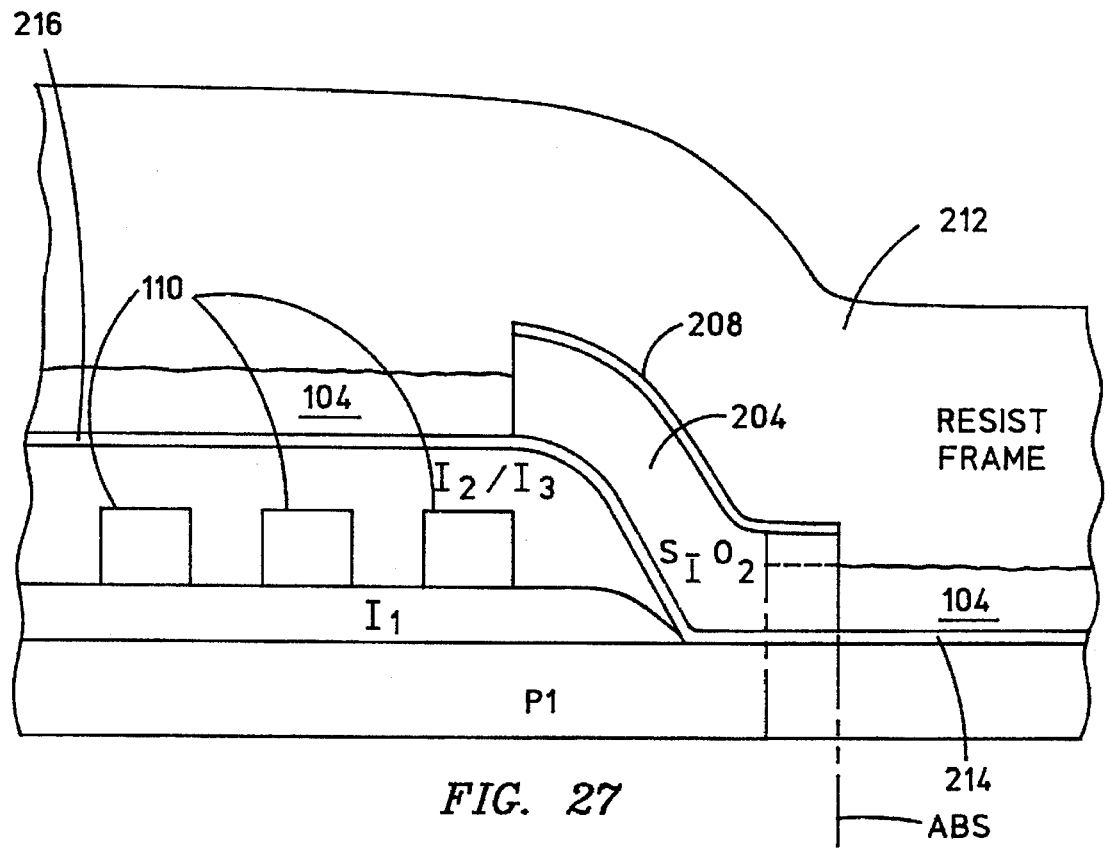
Figure 28:
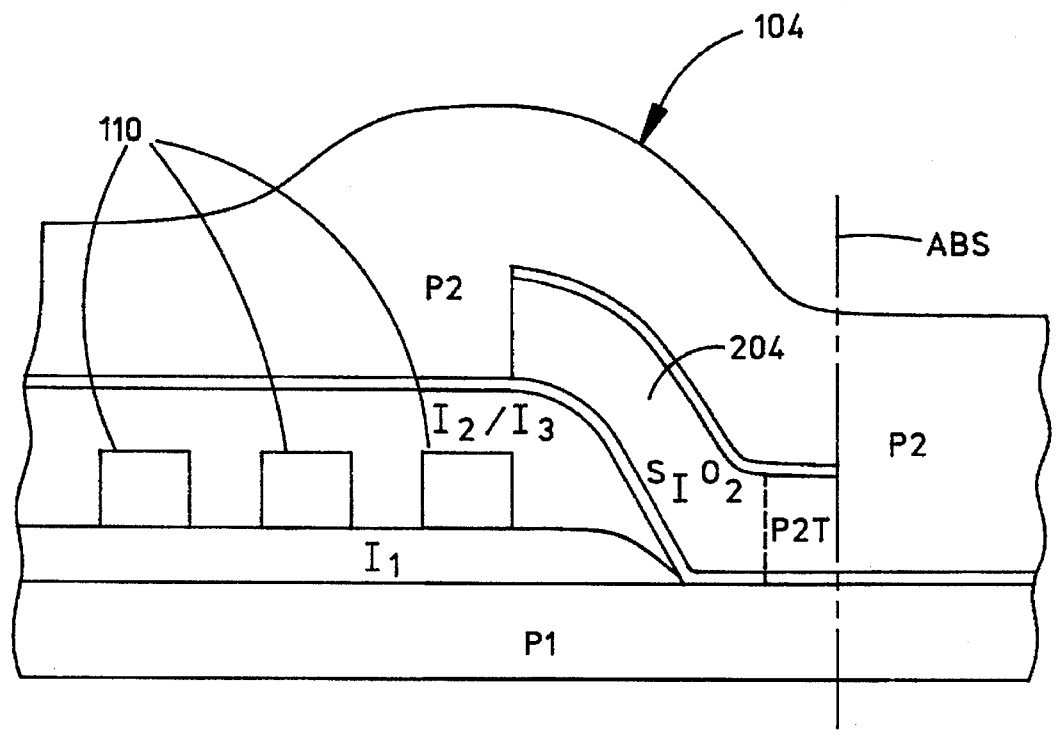

The next step is to frame plate the second pole layer 104 as illustrated in FIGS. 27 and 28. A photoresist frame 212 may be employed for controlling the lateral configuration of the second pole layer 104. FIG. 27 illustrates a partial plating of the second pole layer 104 which is accomplished by the seedlayer portions 214 and 216. Once the electroplating reaches the level of the seedlayer 208 it will then plate on top of this layer to complete the configuration of the second pole layer 104 as illustrated in FIG. 28. As stated hereinabove, the advantage of this embodiment is that the pole tip P2T and the second pole layer 104 can be deposited in one frame plating step which results in one layer. This differs from the previous embodiment in that the second pole layer is stitched to the pole tip P2T instead of being integral with the pole tip P2T as shown in FIG. 28. After completion, the structure shown in FIG. 28 can then be lapped to the ABS.

A variation of the third embodiment illustrated in FIGS. 22 through 28, would be to employ the teachings shown in FIGS. 9b and 21 for the first embodiment for constructing pole tip elements P1T, G and P2T in the trench of the notch structure. This teaching adds several steps after the formation of the notch structure 210 illustrated in FIG. 26. As taught by FIG. 9b and FIG. 21, and as described hereinabove, the pole tip P1T would be frame plated into the trench of the notch structure 210 followed by formation of the gap layer 106. The remainder of the steps would be the same as described for FIGS. 27 and 28. An ABS view of the final structure would be similar to that as shown in FIG. 9b except the short horizontal line between the pole tip P2(T) and the second pole layer P2 would be eliminated so that these elements would be integral with respect to one another.

In regard to all embodiments an aluminum oxide layer is placed over the entire wafer which fills in on both sides of the notch structure and pole tip layers to form a part of the air bearing surface. This step is not shown, but is well understood in the art.

Obviously many modifications and variations of the present invention are possible in light of the above teachings. It is therefore to be understood that, within the scope of the appended claims, the invention may be practiced other than as specifically described.

We claim:

1. A thin film magnetic write head, having a top and a bottom and a pole tip region and a back region, the pole tip region defining a portion of an air bearing surface (ABS), including:

a first magnetic pole layer with a first portion in the pole tip region and a second portion in the back region;

a discrete notch structure formed over the first magnetic pole layer in the pole tip region, the notch structure forming a trench which is located entirely in the pole tip region;

a second magnetic pole layer formed over the first magnetic pole layer with a first portion in the pole tip region and a second portion in the back region;

the first portion of the second magnetic pole layer being formed over and interfacially contacting a top surface of the notch structure so as to completely cover said trench without any intermediate layer therebetween and the second magnetic pole layer being connected to the first magnetic pole layer at the back gap within the back region;

a plurality of insulation layers located between the first and second magnetic pole layers, the notch structure being a distinct structure with respect to said insulation layers;

a coil structure including at least one layer which is sandwiched between said insulation layers and which is located entirely in the back region;

the notch structure being located entirely between the air bearing surface and said coil structure;

a gap layer formed between the first portions of the first and second magnetic pole layers; and at least one magnetic pole tip layer formed in the trench and having an extension defined thereby, the at least one magnetic pole tip layer being directly connected to the first portion of the first magnetic pole layer or to the first portion of the second magnetic pole layer.

2. The thin film magnetic write head of claim 1 including:

a conductive layer located on and forming the entire top surface of the notch structure and having an opening which opens said trench at said top surface.

3. The thin film magnetic write head of claim 2 including:

one of the insulation layers formed over the coil structure, the insulation layer being located between the pole tip region and the back gap;

a portion of the gap layer being located at a bottom of said trench and another portion of the gap layer being located on said one insulation layer; and the gap layer being non-magnetic and conductive.

4. The thin film magnetic write head of claim 3, including:

the said at least one pole tip layer formed in the trench and the first portion of the second magnetic pole layer being a single thin film layer.

5. The thin film magnetic write head of claim 4, the notch structure being constructed of a material which is selected from a group of anisotropically etchable materials that includes silicon dioxide, silicon, silicon nitride, and carbon.

6. The thin film magnetic write head of claim 5, the notch structure including a base and a pair of legs forming a generally U-shaped layer with first and second surfaces, wherein:

the base having an inside front surface, an outside back surface and a pair of outside side surfaces, each of the legs having an outside front surface, an inside side surface, and an outside side surface, the outside side surfaces of the base being contiguous with the outside side surfaces of the legs;

the front surfaces of the legs lying in a common plane which forms part of an air bearing surface; and the front surface of the base and the inside side surfaces of the legs forming the trench inside the U-shaped layer in the pole tip region.

7. The thin film magnetic write head of claim 6, wherein the inside front surface of the base of the U-shaped mask is substantially planar and lies in a plane forming a zero throat level.

8. The thin film magnetic write head of claim 7, wherein the gap layer is formed on the first magnetic pole layer: and the notch structure and the at least one magnetic pole tip layer are formed directly on the gap layer.

9. The thin film magnetic write head of claim 7, further including:

said at least one magnetic pole tip layer being a first magnetic pole tip layer formed in the trench and magnetically connected to the first portion of the first magnetic pole layer in the pole tip region;

a second magnetic pole tip layer formed in the trench and magnetically connected to the first portion of the second magnetic pole layer in the pole tip region; and the gap layer being formed entirely in the trench between the first and second magnetic pole tip layers.

10. The thin film magnetic write head of claim 1, wherein the gap layer is formed on the first magnetic pole layer and the notch structure and the at least one magnetic pole tip layer are formed directly on the gap layer.

11. The thin film magnetic write head of claim 1, including:

said at least one magnetic pole tip layer being a first magnetic pole tip layer formed in the trench and magnetically connected to the first portion of the first magnetic pole layer in the pole tip region;

a second magnetic pole tip layer formed in the trench and magnetically connected to the first portion of the second magnetic pole layer in the pole tip region; and the gap layer lying entirely in the trench between the first and second magnetic pole tip layers.

12. The thin film magnetic write head of claim 1, the notch structure including a base and a pair of legs forming a generally U-shaped layer with first and second surfaces, wherein:

the base has an inside front surface, an outside back surface and a pair of outside side surfaces, each of the legs having an outside front surface, an inside front surface, and an outside side surface, the outside side surfaces of the base being contiguous with the outside side surfaces of the legs;

the front surfaces of the legs lie in a common plane which forms part of an air bearing surface; and the front surface of the base and the inside side surfaces of the legs form the trench inside the U-shaped layer in the pole tip region.

13. The thin film magnetic write head of claim 12, wherein the gap layer is formed on the first magnetic pole layer and the notch structure and the at least one magnetic pole tip layer are formed directly on the gap layer.

14. The thin film magnetic write head of claim 12, further including:

said at least one magnetic pole tip layer being a first magnetic pole tip layer formed in the trench and magnetically connected to the first portion of the first magnetic pole layer in the pole tip region;

a second magnetic pole tip layer formed in the trench and magnetically connected to the first portion of the second magnetic pole layer in the pole tip region; and the gap layer being formed entirely in the trench between the first and second magnetic pole tip layers.

15. The thin film magnetic write head of claim 12, wherein the inside front surface of the base of the U-shaped mask is substantially planar and lies in a plane forming a zero throat level.

16. A read/write magnetic head including the thin film magnetic write head of claim 1, and further including a read head shield layer, the first magnetic pole layer comprising the read head shield layer.

17. The thin film magnetic write head of claim 1, the notch structure being constructed of a material which is selected from a group of anisotropically etchable materials that includes silicon dioxide, silicon, silicon nitride, and carbon.

18. A disk drive including the write head of claim 17, the drive further including:

a housing;

a rotatable magnetic disk mounted in the housing;

means for rotating the magnetic disk; and a support, including a slider, mounted in the housing for supporting the write head in a transducing relationship with respect to the magnetic disk in response to rotation of the magnetic disk.

19. A thin film magnetic write head having a pole tip region and a back region, the pole tip region forming a portion of an air bearing surface (ABS) comprising:

a first magnetic pole layer with a first portion in the pole tip region and a second portion in the back region;

a discrete notch structure on top of the first magnetic pole and having a trench which is located entirely in the pole tip region;

the notch structure being bounded in part by first and second spaced apart exterior front walls which form a part of the ABS, first and second interior sidewalls which are contiguous with the first and second exterior front walls respectively and which form first and second sidewalls of the trench, an interior rear wall which interconnects said first and second interior sidewalls and which forms a rear wall of the trench, and an exterior back wall which is located back of said interior rear wall;

said notch structure being a non-magnetic material;

a pole tip layer in the trench of said notch structure, the pole tip layer having first and second sidewalls and a rear wall which are defined by said first and second interior sidewalls and said interior rear wall of the trench;

a second magnetic pole layer formed over the first magnetic pole layer with a first portion in the pole tip region and a second portion of the back region;

a plurality of insulation layers located between the first and second magnetic pole layers, the notch structure being a distinct structure with respect to said insulation layers;

a coil structure located in the back region and sandwiched between the insulation layers;

the notch structure being located entirely between the air bearing surface and said coil structure; and the first portion of the second magnetic pole layer being formed over and interfacially connected to a top of the notch structure and interfacially connected to and completely covering said pole tip layer within said trench.

20. A magnetic disk drive including the thin film magnetic head as claimed in claim 19, the disk drive comprising:

a housing;

a rotatable magnetic disk mounted in the housing;

means for rotating the magnetic disk; and a support, including a slider, mounted in the housing for supporting the write head in a transducing relationship with respect to the magnetic disk in response to rotation of the magnetic disk.

21. A write head as claimed in claim 19 including:

said interior rear wall being substantially planar and lying in a plane which forms a zero throat level.

22. A write head as claimed in claim 21 including:

said plurality of insulation layers being located back of said back wall of the notch structure.

23. A write head as claimed in claim 22 including:

the top of the notch structure having a top surface which faces the first portion of the second magnetic pole layer and the notch structure having a bottom with a bottom surface which faces the first portion of the first magnetic pole layer;

the notch structure having a metallic layer at its top which forms said top surface; and the metallic layer having an opening which opens said trench at said top surface of the notch structure.

24. A write head as claimed in claim 23 including:

the first portion of the second magnetic pole layer and said pole tip layer being a single thin film layer.

25. A write head as claimed in claim 23 including:

the first portion of the second magnetic pole layer and said pole tip layer being separate thin film layers.

26. A write head as claimed in claim 23 including:

the gap layer being located in said trench.

27. A write head as claimed in claim 23 including:

said gap layer being located between the first magnetic pole layer and said notch structure.

28. A thin film magnetic head having a top and a bottom comprising:

first and second pole pieces which extend between an air bearing surface and a back gap;

a coil, which has at least one layer, sandwiched between a plurality of insulation layers, the insulation layers being sandwiched between said first and second pole pieces;

the magnetic head having a pole tip region which extends from the air bearing surface toward the back gap and a back region which extends from the pole tip region to the back gap;

said coil being located in the back gap region and not being located in the pole tip region;

a discrete notch structure located only between the air bearing surface and said coil and having a trench which is located only in the pole tip region, said discrete notch structure being a distinct structure with respect to said insulation layers;

the trench having an open end at the air bearing surface and a closed end located at a zero throat level of the magnetic head;

the pole tip region being located only between the air bearing surface and the zero throat level; and at least one magnetic pole tip located in said trench and having an extension defined thereby, said at least one magnetic pole tip being directly connected to the first pole piece or to the second pole piece.

29. A magnetic disk drive including the thin film magnetic head as claimed in claim 28, the disk drive comprising:

a housing;

a rotatable magnetic disk mounted in the housing;

means for rotating the magnetic disk; and a support, including a slider, mounted in the housing for supporting the write head in a transducing relationship with respect to the magnetic disk in response to rotation of the magnetic disk.

30. A thin film magnetic head as claimed in claim 28 including:

a gap layer which is constructed of conductive material so as to serve as a seedlayer for forming the second pole piece; and the gap layer being located between the first and second pole pieces and forming a bottom of said trench in said pole tip region and located between said coil layer and the second pole piece in said body region.

31. A thin film magnetic head as claimed in claim 28 wherein said pole tip is a rectangular solid and is directly connected to the second pole piece.

32. A thin film magnetic head as claimed in claim 28 including:

the second pole piece being located above the first pole piece;

said notch structure having a back wall and top and bottom surfaces which extend between the air bearing surface and the back wall and the trench having a rear wall which defines said closed end at said zero throat level, a pair of side walls and an opening which defines said open end at said air bearing surface;

the second pole piece having a first portion located substantially within and at least partially filling said trench, a second portion on top of the notch structure and interfacially connected to said top surface and a third portion which extends from the second portion to the back gap;

the second pole piece having a pole tip portion which consists essentially of said first portion of the second pole piece, and said second portion of the second pole piece extending between the air bearing surface and said back wall of the notch structure and extending beyond said side walls of the trench throughout its extension between the air bearing surface and said back wall of the notch structure.

33. A thin film magnetic head as claimed in claim 32 wherein no portion of said plurality of insulation layers extends over any portion of said trench.

34. A thin film magnetic head as claimed in claim 32 including:

a gap layer between the first and second pole pieces in said pole tip region, the gap layer having top and bottom surfaces;

said insulation layers including a first insulation layer;

said first insulation layer having top and bottom surfaces; and the bottom surface of the notch structure, the top surface of the gap layer and the bottom surface of the first insulation layer all lying substantially in a horizontal plane which is substantially perpendicular to the air bearing surface.

35. A thin film magnetic head as claimed in claim 32 wherein the notch structure comprises silicon dioxide.

36. A thin film magnetic head as claimed in claim 32 including:

the first, second and third portions of the second pole piece being a single thin film layer.

37. A thin film magnetic head as claimed in claim 32 including:

the notch structure having a top conductive metallic layer which forms said top surface of the notch structure; and said conductive layer serving as a mask for forming said trench and as a seedlayer for forming a portion of said second pole piece.

38. A thin film magnetic head as claimed in claim 37 including:

a gap layer being located between and in contact with the first and second pole pieces in said pole tip region and located between said coil layer and the second pole piece in said body region and said gap layer being constructed of conductive material so as to serve as a seedlayer for forming the second pole piece.

39. A thin film magnetic head as claimed in claim 38 wherein no portion of said plurality of insulation layers extends over any portion of said trench.

40. A thin film magnetic head as claimed in claim 39 including:

the first, second and third portions of the second pole piece being a single thin film layer.

41. A magnetic disk drive including the thin film magnetic head as claimed in claim 40, the disk drive comprising:

a housing;

a rotatable magnetic disk mounted in the housing;

means for rotating the magnetic disk; and a support, including a slider, mounted in the housing for supporting the write head in a transducing relationship with respect to the magnetic disk in response to rotation of the magnetic disk.

* * * * *